(12) United States Patent
Patel et al.

(10) Patent No.: US 9,462,427 B2
(45) Date of Patent: Oct. 4, 2016

(54) SYSTEM AND METHOD FOR ELASTIC SCALING USING A CONTAINER-BASED PLATFORM

(71) Applicant: Kodiak Networks Inc., Plano, TX (US)

(72) Inventors: Krishnakant M. Patel, Richardson, TX (US); Ramu Kandula, Plano, TX (US); Brahmananda R. Vempati, Dallas, TX (US); Harisha Mahabaleshwara Negaluli, Richardson, TX (US); Pratap Chandana, Plano, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 14/994,757

(22) Filed: Jan. 13, 2016

(65) Prior Publication Data

US 2016/0205518 A1 Jul. 14, 2016

Related U.S. Application Data

(60) Provisional application No. 62/103,404, filed on Jan. 14, 2015, provisional application No. 62/111,414, filed on Feb. 3, 2015.

(51) Int. Cl.
  *H04W 4/10* (2009.01)
  *H04L 12/24* (2006.01)

(52) U.S. Cl.
  CPC ............... *H04W 4/10* (2013.01); *H04L 41/12* (2013.01)

(58) Field of Classification Search
  CPC ............ G06F 9/45558; G06F 2009/45595; G06F 11/1484; G06F 9/455; G06F 2009/4557; G06F 9/45533; G06F 9/50; H04L 12/4641; H04L 43/08; H04L 49/354; G06Q 10/0633; Y02B 60/142; H04W 4/10; H04W 76/005; H04W 84/08; H04W 4/22
  See application file for complete search history.

(56) References Cited

U.S. PATENT DOCUMENTS

| | | |
|---|---|---|
| 2003/0153340 A1 | 8/2003 | Crockett et al. |
| 2003/0153341 A1 | 8/2003 | Crockett et al. |
| 2003/0161284 A1 | 8/2003 | Chen |
| 2004/0243709 A1 | 12/2004 | Kalyanavarathan et al. |
| 2006/0002328 A1 | 1/2006 | Naghian |
| 2006/0014556 A1 | 1/2006 | Park et al. |
| 2006/0030347 A1 | 2/2006 | Biswaas |
| 2008/0175357 A1* | 7/2008 | Tucker ................ H04L 67/28 379/93.01 |
| 2008/0285487 A1 | 11/2008 | Forslow et al. |
| 2009/0019374 A1 | 1/2009 | Logan et al. |

(Continued)

FOREIGN PATENT DOCUMENTS

EP 2184904 A1 5/2010

*Primary Examiner* — Sujatha Sharma
(74) *Attorney, Agent, or Firm* — Slater Matsil, LLP

(57) ABSTRACT

An embodiment method includes triggering, by a service orchestrator, creation of one or more container instances for a first service cluster. The method further includes creating, by a container manager, the one or more container instances and mapping the one or more container instances of the first service cluster to one or more first virtual machines belonging to a first virtual machine server group in accordance with a platform profile of the first virtual machine server group and the first service provided by the first service cluster. The method further includes mapping, by a virtual machine manager, the one or more first virtual machines to one or more first host virtual machines of a cloud network in accordance with the platform profile of the first virtual machine server group.

31 Claims, 18 Drawing Sheets

(56) References Cited

U.S. PATENT DOCUMENTS

| | | | |
|---|---|---|---|
| 2009/0275341 A1 | 11/2009 | Monnes et al. | |
| 2010/0167709 A1 | 7/2010 | Varadarajan et al. | |
| 2010/0284370 A1 | 11/2010 | Samar et al. | |
| 2011/0137991 A1 | 6/2011 | Russell | |
| 2011/0225277 A1 | 9/2011 | Freimuth et al. | |
| 2013/0151996 A1* | 6/2013 | Nario | H04W 4/003 715/760 |
| 2013/0185667 A1* | 7/2013 | Harper | G06F 11/0709 715/772 |
| 2013/0196706 A1 | 8/2013 | Patel et al. | |
| 2013/0201374 A1* | 8/2013 | Timm | G02B 13/16 348/302 |
| 2013/0290537 A1 | 10/2013 | Shaw | |
| 2014/0074659 A1 | 3/2014 | Chatterjee et al. | |
| 2014/0141743 A1 | 5/2014 | Shaw | |
| 2014/0214893 A1 | 7/2014 | Annapragada et al. | |
| 2014/0221035 A1 | 8/2014 | Denman et al. | |
| 2014/0317261 A1 | 10/2014 | Shatzkamer et al. | |
| 2014/0317293 A1* | 10/2014 | Shatzkamer | G06F 9/455 709/226 |
| 2014/0380041 A1 | 12/2014 | Gupta | |
| 2015/0095917 A1* | 4/2015 | Challenger | G06F 9/4843 718/104 |
| 2015/0288767 A1* | 10/2015 | Fargano | H04L 41/0813 709/227 |
| 2015/0370586 A1* | 12/2015 | Cooper | G06F 9/45533 710/308 |
| 2015/0381423 A1* | 12/2015 | Xiang | H04L 69/03 709/223 |

\* cited by examiner

SYSTEM AND METHOD FOR ELASTIC SCALING USING A CONTAINER-BASED PLATFORM

This patent application claims priority to U.S. Provisional Application No. 62/103,404, filed on Jan. 14, 2015 and entitled "Realization of Elastic Scaling for Push-to-Talk-Over-Cellular (PoC)," and to U.S. Provisional Application No. 62/111,414, filed on Feb. 3, 2015 and entitled "Realization of Elastic Scaling for Push-to-Talk-Over-Cellular (PoC)," which applications are hereby incorporated by reference herein as if reproduced in its entirety.

This patent application is related to the following co-pending and commonly assigned patent application filed on the same date: "System and Method for Elastic Scaling in a Push to Talk (PTT) Platform using User Affinity Groups" Ser. No. 14/994,844, which application is hereby incorporated by reference herein as if reproduced in its entirety.

TECHNICAL FIELD

The present invention relates generally to communications over a telecommunications network, and in particular embodiments, to techniques and mechanisms for a system and method for elastic scaling in push to talk (PTT).

BACKGROUND

Carrier grade telecommunication service deployments may have stringent service availability requirements and may further require geographical redundancy support. Traditionally, telecommunication systems are built using specialized hardware based components that support 1+1 redundancy or N+K redundancy. Each hardware component provides one or more services and the component is usually deployed as a fixed package of these services. Frequently, desire to optimize hardware component cost during deployment drives the need to package multiple service components together and associate them with specific hardware components.

Furthermore, the telecommunication system component packages usually come with a variety of configuration options which makes testing and deployment a challenging endeavor. It is quite common for new service development and deployment cycles to last months or even years in the telecommunication service industry. Also, system capacity expansion requires careful planning due to hardware procurement lead times and complicated hardware installation and setup procedures. As a consequence, telecommunication systems are often overprovisioned to accommodate unexpected growth in service usage.

Virtualization technology and the advent of cloud based Infrastructure-as-a-Service systems all the deployment several services in virtualized environments that support elastic scalability and facilitate rapid deployment through agile continuous integration procedures. This presents an opportunity for realizing substantial cost benefits by operating carrier grade telecommunication systems on modern cloud based infrastructure. However, applying methods of elastic scaling to carrier grade telecommunication services, which are subject to stringent 99.999% service availability and service continuity requirements, result in various challenges.

SUMMARY OF THE INVENTION

Technical advantages are generally achieved, by embodiments of this disclosure which describe systems and methods for providing elastic scaling in a PTT environment.

In accordance with an embodiment, a method includes triggering, by a service orchestrator hosted on a processor, creation of one or more container instances for a first service cluster. The first service cluster provides a first service for a telecommunications services platform. The method further includes creating, by a container manager hosted on a processor, the one or more container instances and mapping, by the container manager, the one or more container instances of the first service cluster to one or more first virtual machines belonging to a first virtual machine server group in accordance with a platform profile of the first virtual machine server group and the first service provided by the first service cluster. The method further includes mapping, by a virtual machine manager hosted on a processor, the one or more first virtual machines to one or more first host virtual machines of a cloud network in accordance with the platform profile of the first virtual machine server group. The method further includes deploying the one or more first host virtual machines on one or more host processors.

In accordance with another embodiment, a method includes triggering, by a processor, creation of one or more container instances for a first service cluster. The first service cluster is one of a plurality of service clusters in a push-to-talk (PTT) platform, and each of the plurality of service clusters provides a different function for the PTT platform. The method further includes creating, by a processor, the one or more container instances and mapping, by a processor, the one or more container instances of the first service cluster to one or more first virtual machines belonging to a first virtual machine server group in accordance with a platform profile of the first virtual machine server group and a first PTT function provided by the first service cluster. The method further includes mapping, by a virtual machine manager hosted on a processor, the one or more virtual machines to one or more first host virtual machines of a cloud network in accordance with the platform profile of the first virtual machine server group. The cloud network is deployed independently from the PTT platform. The method further includes operating the one or more first host virtual machines on one or more host processors to provide the first PTT function for the PTT platform.

In accordance with yet another embodiment, a telecommunications services platform including: one or more processors and one or more computer readable storage mediums storing programming for execution by the one or more processors. The programming includes instructions to trigger, by a service orchestrator, creation of one or more container instances for a service cluster. The service cluster provides a function for the telecommunications services platform. The programming includes further instructions to create, by a container manager, the one or more container instances and map, by the container manager, the one or more container instances of the service cluster to one or more virtual machines belonging to a virtual machine server group in accordance with a platform profile of the virtual machine server group and the function provided by the service cluster. The programming includes further instructions to map, by a virtual machine manager hosted on a processor, the one or more virtual machines to one or more host virtual machines of a cloud network in accordance with the platform profile of the virtual machine server group and operate the one or more host virtual machines to provide the function for the telecommunications services platform.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
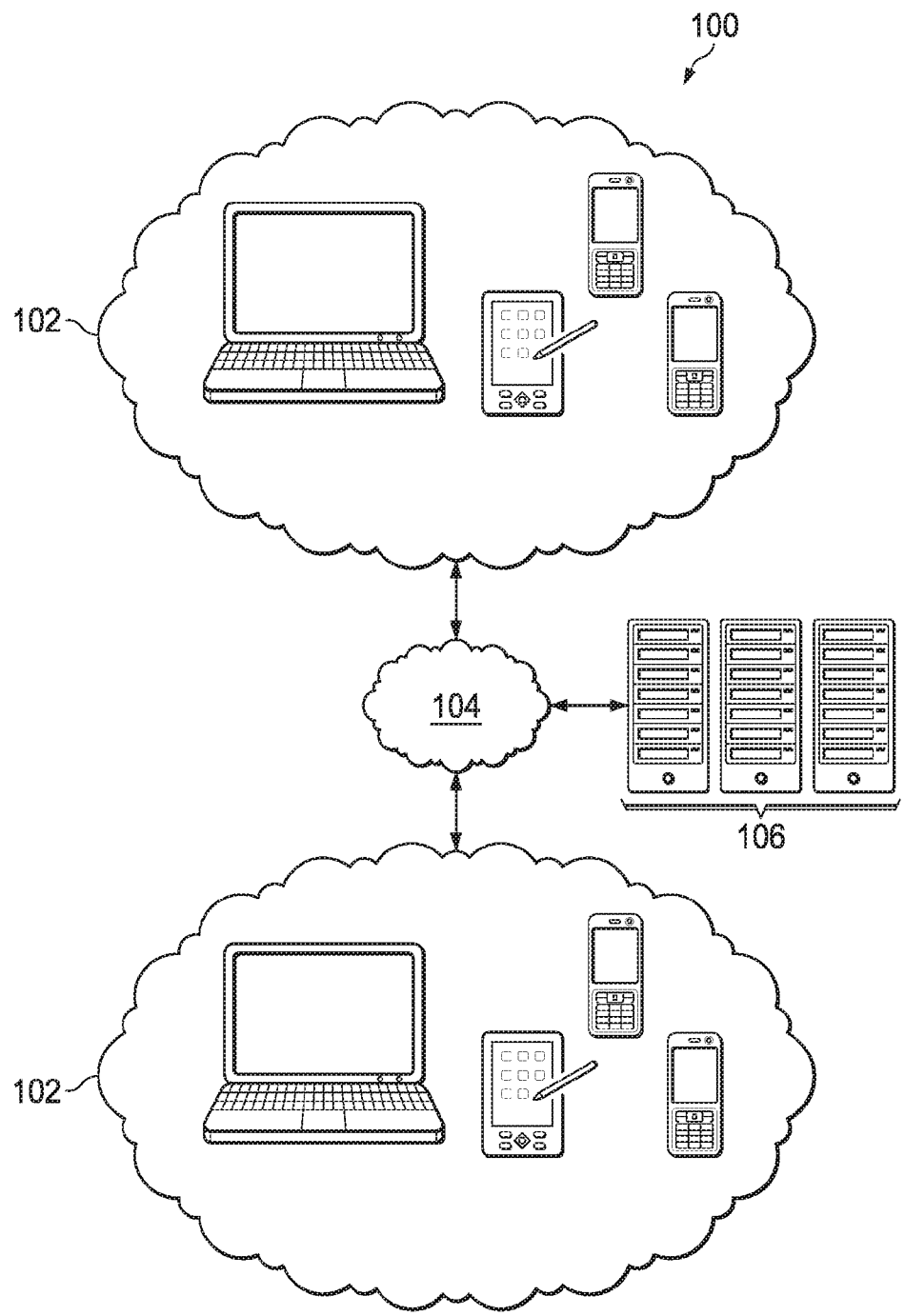
FIG. 1 illustrates a diagram of an embodiment communications network according to some embodiments.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Various embodiments are described within a specific context, namely, elastic scaling using container technology for a push to talk (PTT) system. Various embodiments may, however, be applied to other systems and networks where elastic scaling is desirable.

Various embodiments provide a container technology based platform (e.g., a PTT platform or a PTT over cellular (PoC) platform) for deploying highly scalable telecommunication application services on a cloud infrastructure. An embodiment telecommunications service (e.g., a PTT service) may be realized on the container based platform. The telecommunications services platform uses a layered approach to service orchestration and automates both virtual machine and container manifestation to provide elastic scalability and fault tolerance. For example, management layers are decoupled to manage the physical infrastructure, virtual machines, containers, and services of the telecommunications services platform independently. The layered approach also allows the platform to be integrated into both containers based and hypervisor based service orchestration environments. This approach allows the platform to provide a common container based execution environment to all the service components irrespective of the actual deployment environment. Thus, infrastructure deployment considerations may be decoupled from service deployment. Various embodiments also include mechanisms for balancing a service load within and across deployment sites and for using the platform for the realization of a PTT system.

Various embodiment communications systems may thus achieve one or more of the following non-limiting features and/or advantages: virtualization and scalability; massively scalable cloud-compatible platform supporting multi-site deployments, dynamic load-balancing, and elastic scalability; flexible deployments across different cloud environments including a carrier's private cloud infrastructure; use of Software Defined Networking (SDN) and optimized or at least improved Network Function Virtualization (NFV); resilience and operational efficiency; self-healing service logic to automatically or semi-automatically recover from component failure; simple and efficient operational procedures to ensure carrier grade service for various subscribers; automated zero-downtime (or at least reduced downtime) rolling upgrade; and facilitating agile continuous integration processes for faster rollout of new features.

FIG. 1 illustrates a communications system 100, which provides an architecture for supporting a telecommunications service solution in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wirelessly enabled devices. Applications (e.g., PTT clients) reside on client devices 102 for accessing various functions (e.g., PTT functions) provided by the telecommunications system.

Client devices 102 may communicate with a telecommunications services platform 106 over network 104 (e.g., the Internet, an IP network, or the like), which may be accessed by client devices 102 through a cellular network deployed by a carrier, a WiFi network, a radio access network (RAN), other wireless networks, a wired network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

Subscribers to telecommunications service solution (e.g., users operating client devices 102) may be provisioned onto system 100 via interfaces to carriers (e.g., cellular carriers). In an embodiment where telecommunications services platform 106 is a PTT platform or more specifically, a PTT over-cellular (PoC) platform, PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. Telecommunications services platform 106 may provide a plurality of functions to client devices 102 through the clients on client devices 102 as described in greater detail below.

In some embodiments, telecommunications services platform 106 uses container technology for virtualization of a system architecture, such as, the virtualization of provided PTT services. Example container technologies may include Docker, Rocket, LXD, and the like although the architecture is not limited to a specific container technology. Virtualization using container technology may allow telecommunications services platform 106 to adopt a micro-services model in which service clusters are considered the building blocks of the system architecture. For example, each service or function provided by telecommunications services platform 106 may be virtualized in a unique service cluster, and each service cluster may perform a different service or function in telecommunications services platform 106. In an embodiment, each service cluster is realized by one or more of containers orchestrated to make up a respective service and operate together as a cluster to provide scalability and resilience. The containers of a service cluster may be a same type or different types. Each element (e.g., each container) of the cluster implements a mechanism to announce its availability and enables other components of the system to discover the element's interfaces. The telecommunications services platform may further implement self-healing service logic to automatically recover from component failure and include multi-site deployment capability for added resilience.

The telecommunications service system architecture includes a collection of independent service clusters that communicate with each other through pre-defined interfaces to fulfill service work flows. Decomposition of the system architecture into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, telecommunications services platform 106 incorporates distributed databases, clustering technologies, data analytics tools, and high performance messaging middleware to provide a robust, scalable platform. Telecommunications services platform 106 may use fully virtualized components with layered approach to service orchestration, which allows telecommunications services platform 106 to be integrated into various cloud environments, such as a carrier's private cloud infrastructure, a dedicated cloud infrastructure for the telecommunications services platform (e.g., a dedicated PTT cloud infrastructure), combinations thereof, and the like. As described in greater detail below, the cloud network and the telecommunications services platform 106 may be deployed independently to advantageously decouple design time considerations of the telecommunications services platform 106 from the actual deployment concerns of the cloud network.

In an embodiment cloud environment that provides container level orchestration application program interfaces (APIs), telecommunications services platform 106 may directly use the container level orchestration APIs to instantiate service containers as needed. In other cloud environments without container level orchestration APIs (e.g., a hypervisor based infrastructure as a service (IaaS) cloud environments), telecommunications services platform 106 may provide its own container management layer that is built on top of a virtual machine management layer. This approach allows telecommunications services platform 106 to provide a single container based execution environment to various service components irrespective of the physical deployment environment of telecommunications services platform 106. Thus, telecommunications services platform 106 decouples infrastructure deployment considerations from service deployment, and use of virtualization and container technology also allows the telecommunications services platform to break away from a traditional hardware-centric component model to system deployment. An embodiment layered infrastructure management architecture of a telecommunications services platform 106 is illustrated in FIG. 2.

Figure 2:
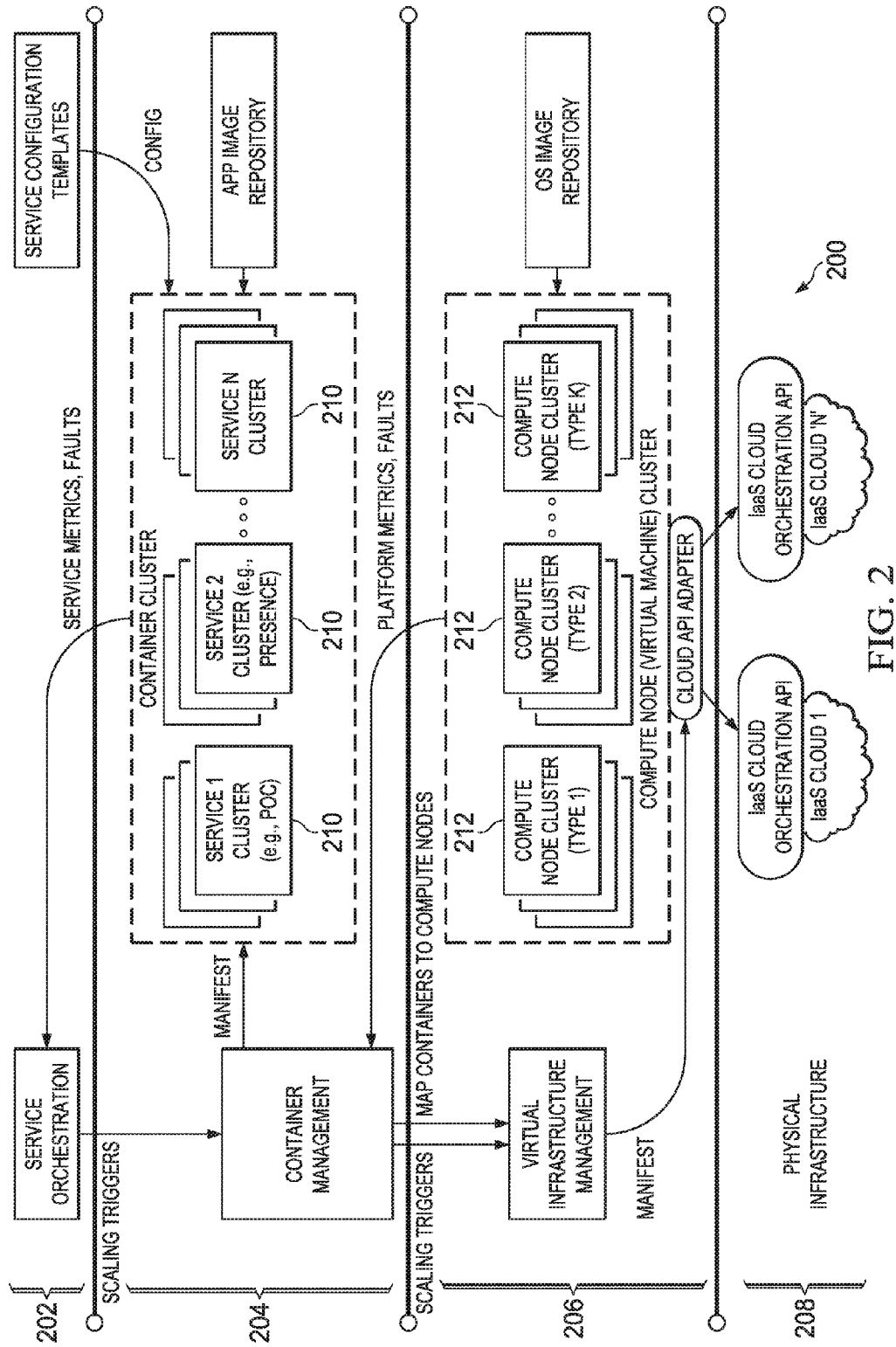
FIG. 2 illustrates a block diagram of infrastructure management in a telecommunications services platform according to some embodiments.

As illustrated by FIG. 2, telecommunications services platform 106's infrastructure management architecture 200 includes a service orchestration layer 202, a container management layer 204, a virtual infrastructure management layer 206, and a physical infrastructure layer 208. Each layer may include a controller, such as a virtual controller hosted on a processor for performing the various functions provided by the layer, a dedicated hardware controller, and the like. In an embodiment, the controllers of each layer are setup as part of a bootstrap procedure for the platform. These controllers may be hosted on dedicated physical hardware or on one or more virtual compute node instances of physical infrastructure layer 208. In embodiments where the controllers are hosted on physical infrastructure layer 208, specific hardware resources may be reserved for the purpose of hosting the controllers.

Service orchestration layer 202 is the highest layer of abstraction in infrastructure management architecture 200. Service orchestration layer 202 is a layer on top of which various service components that constitute the telecommunications services platform operate. A service orchestrator in service orchestration layer 202 uses service metrics to scale service clusters 210 (referred to collectively as the container cluster) for each service component (e.g., the various service components illustrated in FIG. 3, below). Scaling service clusters 210 may include transmitting scaling triggers to lower layers (e.g., container management layer 204). In some embodiments, the scaling of service clusters 210 may be in real time. These scaling triggers may be based on service metrics transmitted to service orchestration layer 202 from lower layers (e.g., container management layer 204). In some embodiments, scaling triggers on based on service metrics collected from various service components running on respective service clusters in the platform. Embodiment service metrics for a PTT platform may include, for example, number of PTT pre-established sessions, PTT call setup rate, PTT call leg setup rate, number of concurrently active PTT calls, number of concurrently active PTT call legs, number of media codec instances in active use, combinations thereof, and the like. Service orchestration layer 202 may also create new container instances to replace failed container instances, for example, based on faults transmitted to service orchestration layer 202 from lower layers (e.g., container management layer 204).

Container management layer 204 operates on top of a pool of virtual machines (e.g., compute nodes 212 in virtual infrastructure management layer 206) to manage the distribution of services clusters 210 across various compute nodes 212. For example, container management layer 204 may manifest container instances for each service cluster 210 across compute nodes 212. In some embodiments, container management layer 204 tracks platform metrics (e.g., computer processing unit (CPU) metrics, random access memory (RAM) metrics, combinations thereof, and the like) across various virtual machines (e.g., compute nodes 212) and uses these metrics to distribute the service container load (e.g., service clusters 210) across compute nodes 212. For example, each compute node 212 may be grouped into compute node clusters (also referred to as virtual machine server groups) based on a platform profile (e.g., CPU parameters, RAM parameters, storage parameters, network input/output (I/O) capacity, and the like) provided by a respective compute 212. Container management layer 204 manages compute node clusters with different platform profiles and maps service clusters 210 to compute nodes 212 providing computing resources in accordance with a service provided by and/or expected resource usage of a respective service cluster 210.

Container management layer 204 may instantiate new compute nodes to scale the system when needed based on the platform metrics. For example, container management layer 204 may transmit scaling triggers to virtual infrastructure management layer 206 to instantiate new compute nodes or to remove compute nodes as desired. In some embodiments, container management layer 204 may also transmit desired compute node platform profiles with the scaling triggers to virtual infrastructure management layer 206.

Container management layer 204 may ensure a desired redundancy in the system by distributing container instances belonging to a same service across multiple compute nodes. Container management layer 204 also triggers the creation of new compute nodes to replace failed instances. Container management layer 204 may also enforce container affinity policies to ensure that related container groups (e.g. a PTT server and a media server) are co-located on the same host. Platform design may determine which container groups (e.g., which service clusters) should be may be related. For example, when there is a high chance of intercommunication between container groups (e.g., a PTT call server and a PTT media server during a PTT call), placing these container groups together on the same host will reduce latency (e.g., the latency of PTT call setup and floor control operations).

Virtual infrastructure management layer 206 provides a bridge between orchestration layers (e.g., service orchestration layer 202 and container management layer 204) and the physical infrastructure (e.g., physical infrastructure layer 208) of the telecommunications services platform. Virtual infrastructure management layer 206 provides an abstract interface to the physical cloud infrastructure and allows telecommunications services platform 106 to be ported to different cloud environments.

In some embodiments, virtual infrastructure management layer 206 executes scaling triggers received from container management layer 204 and uses the underlying cloud infrastructure management APIs (e.g. OpenStack) to build up compute nodes (e.g., compute nodes 212) with a requested platform profile. In some embodiments, the requested platform profile may include a combination of CPU parameters, RAM parameters, storage parameters, network I/O capacity, and the like as requested by container management layer 204.

Physical infrastructure layer 208 can be provided as part of carrier's private cloud, a public cloud, or a combination thereof. Physical infrastructure layer 208 is a physical implementation of virtual infrastructure management layer 206. Various telecommunications services are encapsulated in containers, mapped to virtual machines, and hosted on physical hardware components (e.g., processors) in physical infrastructure layer 208. In some embodiments, physical infrastructure layer 208 may use commercially available off-the-shelf (COTS) components, which may allow the implementation of telecommunications services platform 106 without specialized hardware. Furthermore, physical infrastructure layer 208 may be capable of spanning multiple datacenters at different sites to provide geographic redundancy for greater resiliency.

Figure 3:
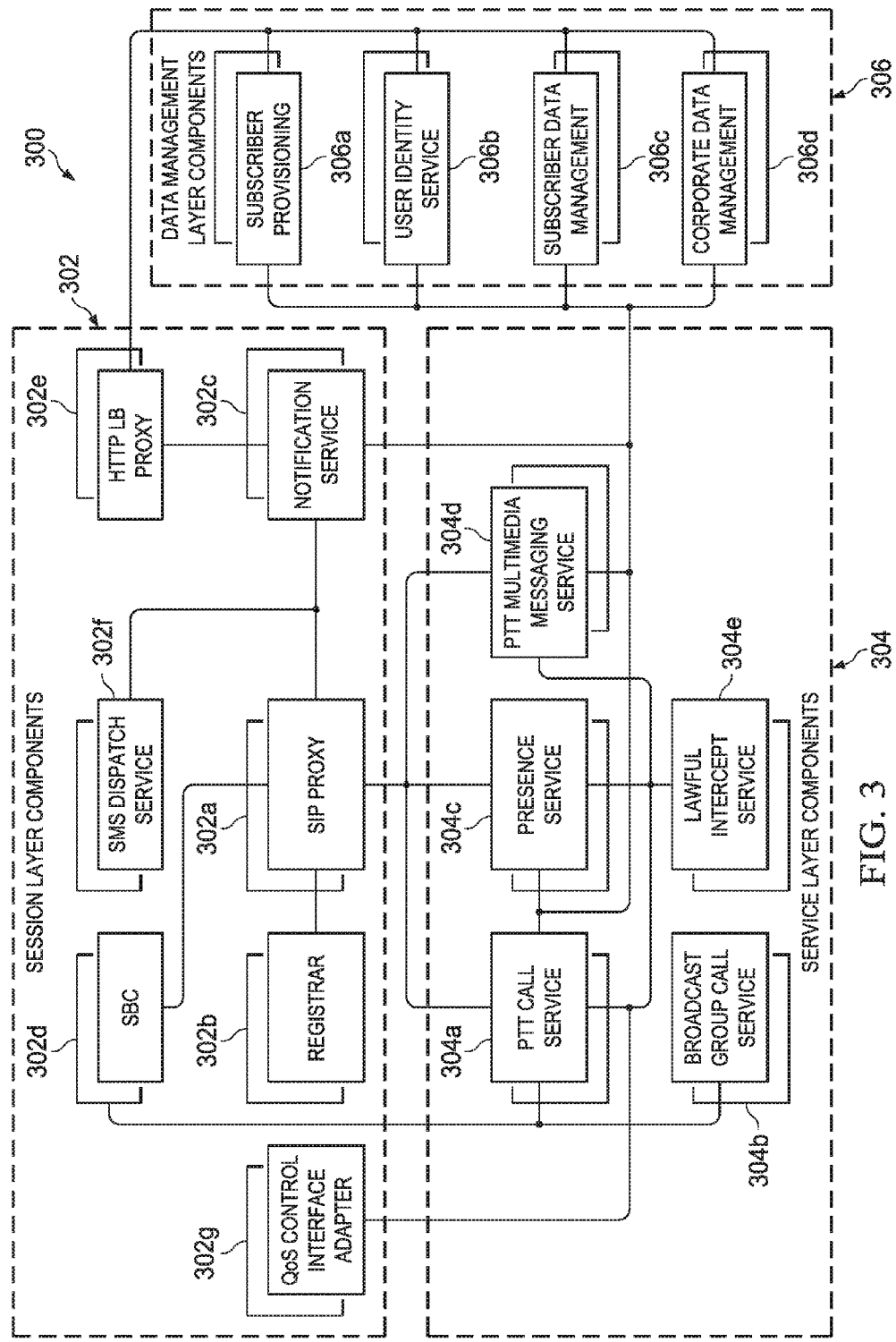
FIG. 3 illustrates a block diagram of various service components in the telecommunications services platform according to some embodiments.

FIG. 3 illustrates a block diagram of service components 300 according to some embodiments where telecommunications services platform 106 is a PTT platform. Each service components 300 may be virtualized as a unique service cluster 210, distributed on virtual compute nodes 212, and implemented on a private/public cloud platform as described above with respect to FIG. 2. Service components 300 may be organized in one or more functional layers, such as a session layer 302, a service layer 304, and a data management layer 306.

In an embodiment, session layer 302 may include a session initiation protocol (SIP) proxy service 302a, a registrar service 302b, a notification service 302c, a session border controller (SBC) service 302d, a HTTP proxy service 302e, SMS dispatch service 302f, a quality of service (QoS) control interface adapter 302g, or a combination thereof. SIP proxy service 302a may route SIP traffic to corresponding services (e.g. call service, presence service, and the like); serve as a SIP load balancer; offload the client connection management from the backend services; enable all services to reach the client through a common connection; or a combination thereof. Registrar service 302b may maintain client connectivity information in a database (DB) that is shared with all (or at least a subset of) other services. The other services can use this data to route SIP messages to client via an appropriate SIP proxy instance. Registrar service 302b may also track the status of the proxy elements and identify/recover stale client sessions connections in the event of a proxy element failure. Notification service 302c allows all (or at least a subset of) services to send asynchronous notifications to clients via different mechanisms such as SIP, short message service (SMS), email, and the like. In some embodiments, clients may maintain an always-on transport path with the notification service for SIP notification reception. SBC service 302d receives traffic entering into the PTT System from the internet protocol (IP) multimedia subsystem (IMS) core. SBC service 302d provides SIP application level gateway (ALG) and Media network address translation (NAT) functions. HTTP proxy service 302e may receive some or all HTTP traffic relating to provisioning, corporate data management, and client data management. SMS dispatch service 302f is used by notification service 302c to send SMS notifications related to the user's PTT service to the client. Some examples of the SMS notifications include service activation and deactivation messages, service maintenance alerts, and the like. QoS control interface adapter 302g provides a customizable interface to carrier's QoS control system (e.g. policy and changing rules function (PCRF) receive (Rx) interface) for implementing dynamic QoS control logic.

In an embodiment, service layer 304 may include PTT call service 304a, broadcast call service 304b, presence service 304c, PTT multimedia messaging service 304d, lawful intercept service 304e, or a combination thereof. PTT call Service 304a provides an entry point to all (or at least a subset of) call services to telecommunications services platform 106. PTT call service 304a manages POC pre-established sessions, for example, by handling one-on-one (1-1), pre-arranged group and adhoc group calls over on-demand and pre-established sessions. PTT call service 304a also implements predictive wakeup technology (e.g., as described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference) to deliver faster call setup times. Broadcast call service 304b implements a broadcast call service using the PTT call services. Broadcast call service 304b implements staggered delivery algorithms to provide real-time delivery to as many users as possible while avoiding Radio Access Network (RAN) congestion and overloading of PTT call service component. Presence service 304c implements presence and location services. Presence service 304c utilizes a notification service 302c for delivery of presence and location information effectively using RAN friendly algorithms. PTT multimedia messaging service 304d provides various messaging services such as instant personal alerts, geo-location tagged text, multi-media messaging, and the like. Lawful intercept service 304e implements the lawful intercept services for all other PTT services based on various regulatory requirements.

In an embodiment, data management layer 306 may include subscriber provisioning service 306a, user identity management service 306b, subscriber data management service 306c, corporate data management service 306d, or a combination thereof. Subscriber provisioning service 306a is used to manage a subscriber lifecycle in the telecommunications services platform 106. It provides subscriber and account management APIs to manage subscribers individually and/or in batches. User identity management service 306b provides various mechanisms such as Short Message Service (SMS), email, OAuth, Security Assertion Markup Language (SAML), and the like to verify various user identities. Subscriber data management service 306c provides APIs to various clients to configure client data (e.g., contacts, groups, call policies, and the like) as desired for using various PTT System services. Corporate data management service 306d provides APIs to enable corporate administrators to setup contact lists and groups for the subscribers belonging to each corporation's account.

Although FIG. 3 illustrates specific service components, an embodiment PTT platform may include any combination of the above components. Other service components may also be included in an embodiment system depending on platform design.

Figure 4:
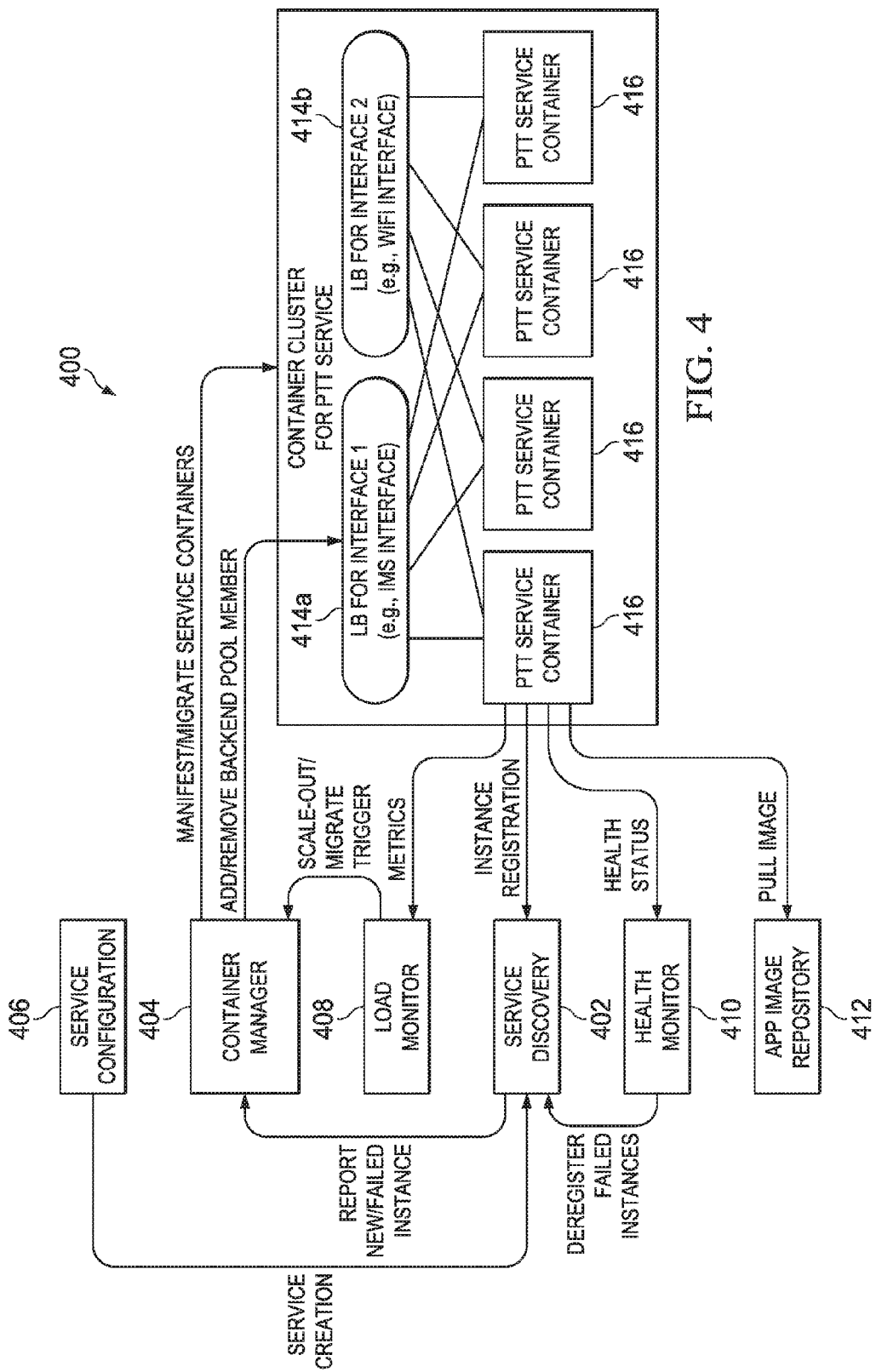
FIG. 4 illustrates a block diagram of interactions components of a service orchestration layer and container management layer in a telecommunications services platform according to some embodiments.

FIG. 4 illustrates a block diagram 400 of interactions between various service orchestration and container management modules/layers (e.g., service orchestration layer 202 and container management layer 204) in an embodiment telecommunications services platform (e.g., telecommunications services platform 106). In some embodiments, service cluster management is function of service orchestration. As part of service cluster management, telecommunications services platform 106 may perform one or more of the following non-limiting functions: service instantiation and configuration, automatically scaling the system based on one or more capacity indicators (e.g., service metrics and/or platform metrics), automatically updating a load balancer pool when new pool members are added or removed, and migrating containers from one host (e.g., a virtual compute node) to another host when a host is overloaded.

As illustrated by FIG. 4, telecommunications services platform 106's service orchestration and container management modules includes a service discovery module 402, a container manager 404, a service configuration module 406, a load monitor 408, a health monitor 410, and an app image repository 412. The various modules interact with load balancers in order to manage various service containers 416. Load balancers in telecommunications services platform 106 may be interface specific, and telecommunications services platform 106 may include a load balancer 414a for IMS interface, a load balancer 414b for WiFi interface, combinations thereof, and the like. In some embodiments, a service orchestration layer (e.g., service orchestration layer 202) includes service configuration module 406, service discovery module 402, health monitor 402, and load monitor 404, and these various components may be collectively make up portions of a service orchestrator. In some embodiments, a container management layer (e.g., container management layer 204) includes container manager 404 and app image repository 412. When new service containers 416 are created and the application comes up successfully (e.g., when the application is initialized and has opened all its interfaces), the service containers 416 register their availability with the service discovery module 402. Each service container 416 may be part of a service cluster to provide a PTT service as described with respect to FIGS. 2 and 3, above. Service discovery module 402 may also detect when a service container 416 fails. When a new service container 416 is registered, service discovery module 402 executes logic to allow the interfaces of the new service container 416 to be discoverable by the other components (e.g., other containers and modules) in the system. Depending on the service, the discoverability of a new service container may be restricted, by service discovery module 402, to the local site of the new service container, or the discoverability may span across different sites. A more detailed description of service discovery module 402 operations is provided with respect to FIGS. 5, 6, and 7, below.

Container manager 404 encapsulates service-specific orchestration logic for various service components in the telecommunications services platform. Container manager 404 creates new container instances based on scaling triggers received from load monitor 408 and/or service fault events received from service discovery module 402. When instantiating a new service container 416, container manager 404 may also instantiate other containers and configure other services (e.g., load balancers) to support the new service container 416. In some embodiments, container manager 404 ensures that the service containers 416 of a service cluster are distributed across different compute nodes (e.g., virtual compute nodes 212, see FIG. 2) in order to provide a desired redundancy. For example, container manager 404 may ensure telecommunications services platform provides 'K'-redundancy for each service by ensuring that there are at least 'K' compute node instances available for each service where 'K' is any positive integer. Container manager 404 further enforces anti-affinity policies to ensure that container instances that are a part of service cluster are distributed across different virtual machines to provide sufficient redundancy for the service cluster. Container manager 404 may also distribute service containers 416 across different available compute nodes (e.g., virtual compute nodes 212, see FIG. 2) to balance the container load. A more detailed description of container manager 404 operations is provided with respect to FIGS. 8, 9, and 10, below.

Service configuration module 406 provides a generic template based configuration for various services. When a new component (e.g., a new service container 416) is instantiated, the component pulls a required service configuration from a corresponding template of a service cluster the component belongs to. In order to support automatic elastic scalability, all elements in a service cluster may operate using an identical service configuration. Furthermore, by using such templates, service configuration module 406 may also ensure that any changes to the service configuration of a service cluster are automatically propagated to all the containers in the service cluster.

Load monitor 408 is part of the real-time analytics system. Load monitor 408 may use various metrics received from service containers 416 to determine capacity indicators for each service container 416. Load monitor 408 may then generate scaling triggers based on the analysis of these capacity metrics. For some services, capacity indicator metrics may include CPU usage, RAM usage, and the like. Load monitor 408 may also monitor other metrics for services such as media sessions, number of active SIP dialogs, transaction throughput, and the like in order to determine system load.

Load monitor 408 may also track various virtual machines (e.g., compute nodes) to see if a virtual machine is overloaded due to load skew. When overloading due to load skew is detected, load monitor 408 may trigger container manager 404 to migrate service containers 416 from the overloaded host virtual machine to another virtual machine having spare capacity. In order to support smooth container migration, applications in the service containers 416 may support a drain state in which the applications either: exit gracefully after completing existing tasks, migrating existing tasks, or a combination thereof.

Various service containers 416 periodically report their health status to the health monitor 410. The services containers 416 may ensure internal subsystems and interfaces in a container are functional by using appropriate internal diagnostic mechanisms. When a service container fault is detected, health monitor 410 propagates the fault information to service discovery module 402 and container manager 404 in order to trigger various recovery functions. For example, service discovery module 402 may de-register failed instances and create new replacement instances.

App image repository 412 stores the application container images for various services components. When manifesting a new container instance, a required image is automatically pulled from app image repository 412 for the container. In some embodiments, a container image repository is a file store from which application images are pulled when creating new container instances. The container image repository may be hosted locally in each deployment site as part of the telecommunications services platform.

Figure 5:
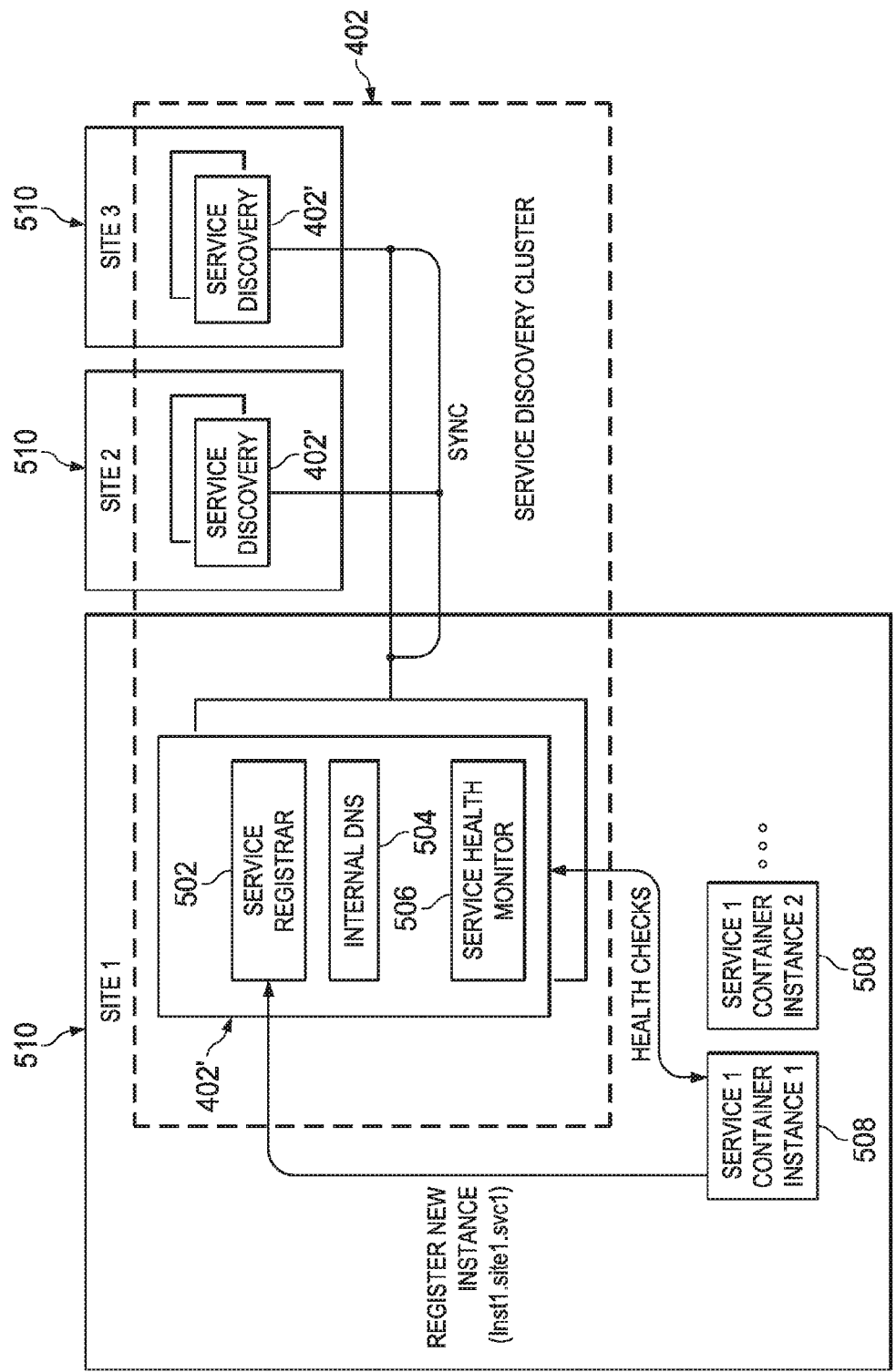
FIGS. 5 through 7 illustrate a block diagrams of a service discovery for the telecommunications services platform according to some embodiments.
Figure 6:
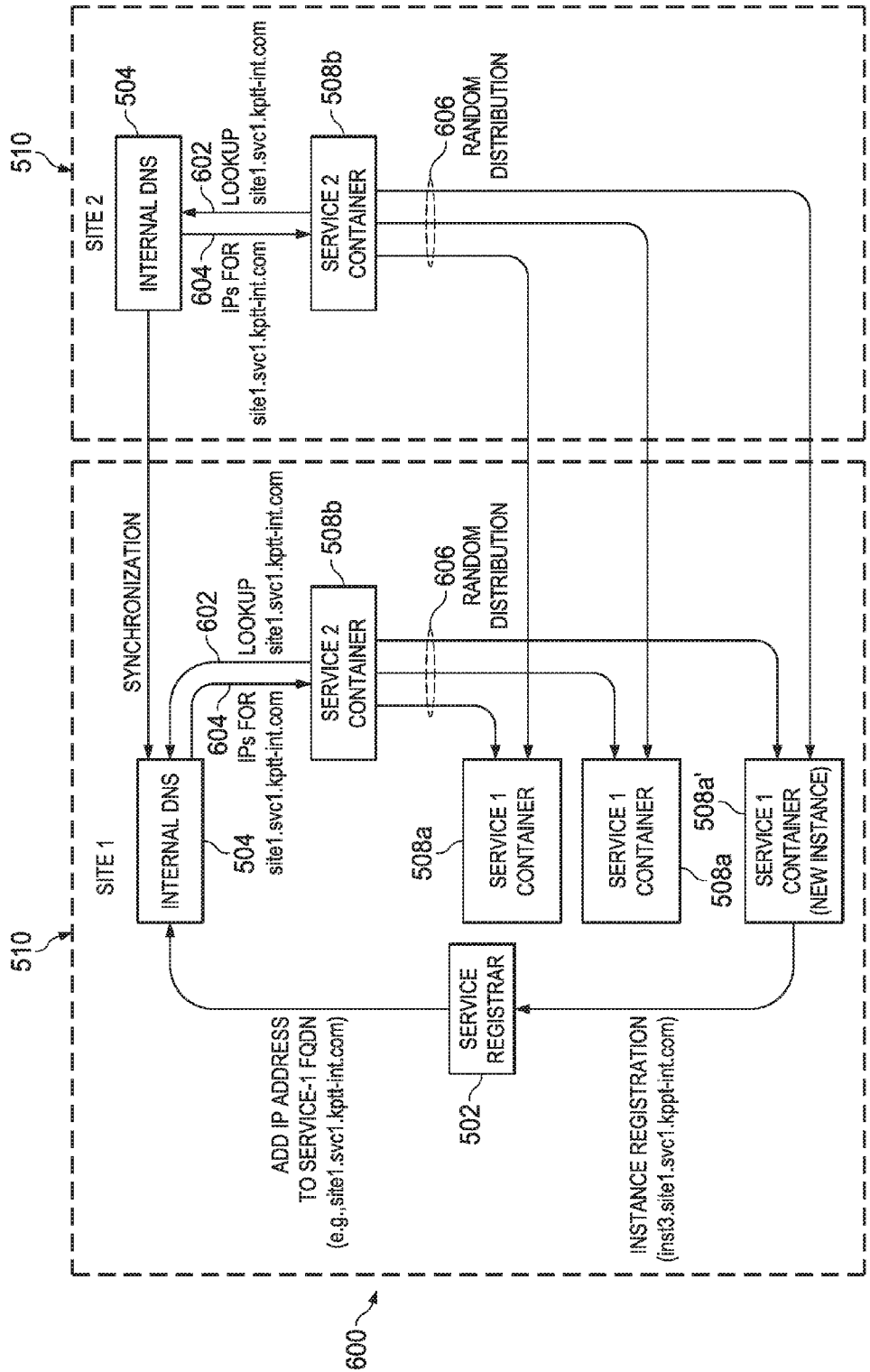
Figure 7:
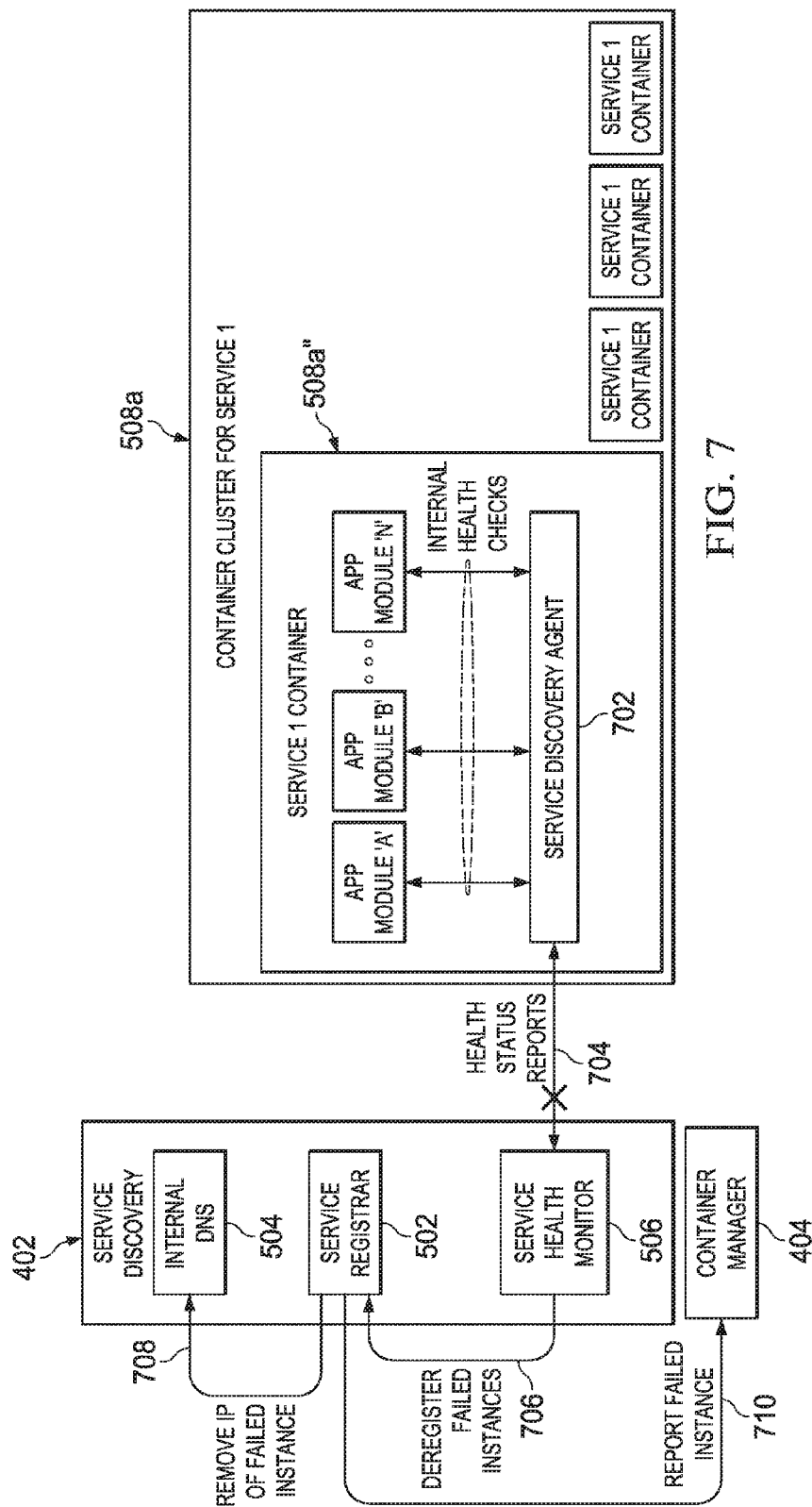

FIGS. 5, 6, and 7 illustrate block diagrams of service discovery module 402 operations according to some embodiments. Service discovery module 402 binds various service clusters of the telecommunications services platform (e.g., a PTT platform) together by performing logic to ensure that interfaces of each component (e.g., containers) are discoverable by the other components in the system. Depending on the service, the discoverability may be restricted to a local site or may span across different deployment sites (e.g., all deployment sites).

As illustrated by FIG. 5, service discovery module 402 includes a service registrar 502, an internal domain name system (DNS) 504, and a health monitor 506, which may be deployed at each deployment site 510. Service registrar 502 allows components in the system (e.g., service container instances 508) to register the availability their interfaces to the system. Internal DNS 504 exposes interfaces of system components (e.g., as registered with service registrar 502) to the other components across the system. Health monitor 506 ensures defunct interfaces (e.g., interfaces of failed components) are timely removed from service registrar 502. Service discovery module 402 may include other components as well in other embodiments.

In some embodiments, service registrar 502 is responsible for maintaining a service catalog recording all available service container instances 508 of all services in the system. Whenever are new container is created and the application comes up successfully, the container registers its availability with service registrar 502. When a new container is registered, the service discovery module 402 executes the logic to ensure that all the interfaces of the new container are discoverable by other components (e.g., other containers) in the system through the service catalog and internal DNS 504. Service discovery module 402 may further synchronize the service catalog and other service related information across all deployment sites 510 in the system. For example, service discovery module 402 may synchronize service discovery instances 402' (referred to collectively as a service discovery cluster) across all deployment sites 510. This enables various applications to discover services in any deployment site.

FIG. 6 illustrates a block diagram of internal DNS 504 and service registrar 502 operations according to some embodiments. In various embodiments, each service in the system is provided with a unique site-level fully qualified domain name (FQDN). For example, an embodiment FQDN format for a service at a deployment site 510 may be "site1.poccallsvc.kptt-internal.com," where "site1" identifies the specific deployment site 510, "poccallsvc" identifies the specific service, and "kptt-internal.com" identifies the system domain. In some embodiments, FQDNs may be derived from a template, such as the above example (e.g., a site identifier.a service identifier.a system domain identifier). In such embodiments, the system domain identifier is specified as part of system configuration and service identifiers for each service is fixed by design and known by all components. A priori knowledge of various identifiers is used for accessing a service catalog and for service configuration. As part of service registration procedure, a new service container 508a' associates its interface's IP address with a FQDN of a service cluster 508a, that new service container 508a' belongs to. The new service container 508a' may register its interface's IP address with service registrar 502, which adds the IP address with internal DNS 504. Thus, the interface of new service container 508a' is visible to other service elements, and allows the other service elements to communicate with the new container using DNS lookup.

When a component (e.g., service cluster 508b) wishes to send a message to a peer component (e.g., service cluster 508a), it queries internal DNS 504 to obtain a list of active IP addresses for the peer component. This transaction is illustrated in FIG. 6 as arrows 602 (e.g., querying the internal DNS 504) and arrows 604 (e.g., the returned list of active IP addresses of the peer component). Subsequently, the component randomly picks one of the IP addresses from the returned pool of IPs to transmit the message to the peer component as indicated by arrows 606. In some embodiments, a single service may include multiple interfaces to provide different services or multiple interfaces to provide a same service. In such embodiments, the service uses a different service FQDN for each of its interfaces and registers all its interfaces with service registrar 502.

Service discovery module 402 may further automatically remove the IPs of failed components from internal DNS 504 to ensure that no traffic is directed towards an unresponsive or failed component as illustrated by FIG. 7. In some embodiments, a service discovery agent 702 runs within each service container 508a″, and service discovery agent 702 tracks the health status of all internal application modules and resources used within the container. Service discovery agent 702 may transmit health status reports to a service health monitor 506 of service discovery module 402 as indicated by arrow 704. When service health monitor 506 detects a container instance failure (e.g., as indicated by a health status report), service health monitor 506 removes the failed container instance from the service catalog through service registrar 502 as indicated by arrow 706. Service registrar 502 may then automatically deregister all interfaces of the failed container instance from internal DNS 504 as indicated by arrow 708. Service registrar 502 may further report the failed container instance to container manager 404 as indicated by arrow 710.

In various embodiments, the service discovery cluster of service discovery module 402 is initially setup as part of a bootstrap process of the PTT platform. Each service discovery component is deployed on a virtual machine cluster hosted on one or more physical processors, which is orchestrated using cloud orchestration APIs. When one element of the service discovery cluster goes down, the element may be immediately replaced by the cloud virtual machine orchestration layer with a new virtual machine instance to join the cluster. As long as at least one instance of service discovery module 402 is available, the system auto-recovers when the cloud virtual machine orchestration layer spawns replacement virtual machine instances. If all instances of service discovery module 402 fail, the platform may be restarted using a bootstrap procedure, which may be triggered manually (e.g., by a platform operator) or by another system outside of the platform.

Container management in an embodiment system will be described with respect to FIGS. 8, 9, and 10 below. In various embodiments, container management involves mapping service workloads (e.g., service containers) to a pool of available virtual machines, which may include different types of virtual machines. Distributing service containers across various compute nodes (e.g., virtual machines) may be in accordance with one or more of the following factors: service affinity constraints, virtual machine server group selection, service bundle management, auto-scaling based on service metrics, minimum and maximum thresholds for number of service container instances, virtual machine resource utilization, anti-affinity rules to spread service container instances evenly across different compute nodes and/or deployment sites, load skew correction, and the like. In some embodiments, anti-affinity rules that constrain the choice of virtual machine for placing a new container instance may include one or more of the following: virtual machine server group selection, service bundle management, and the like as explained in greater detail below.

Figure 8:
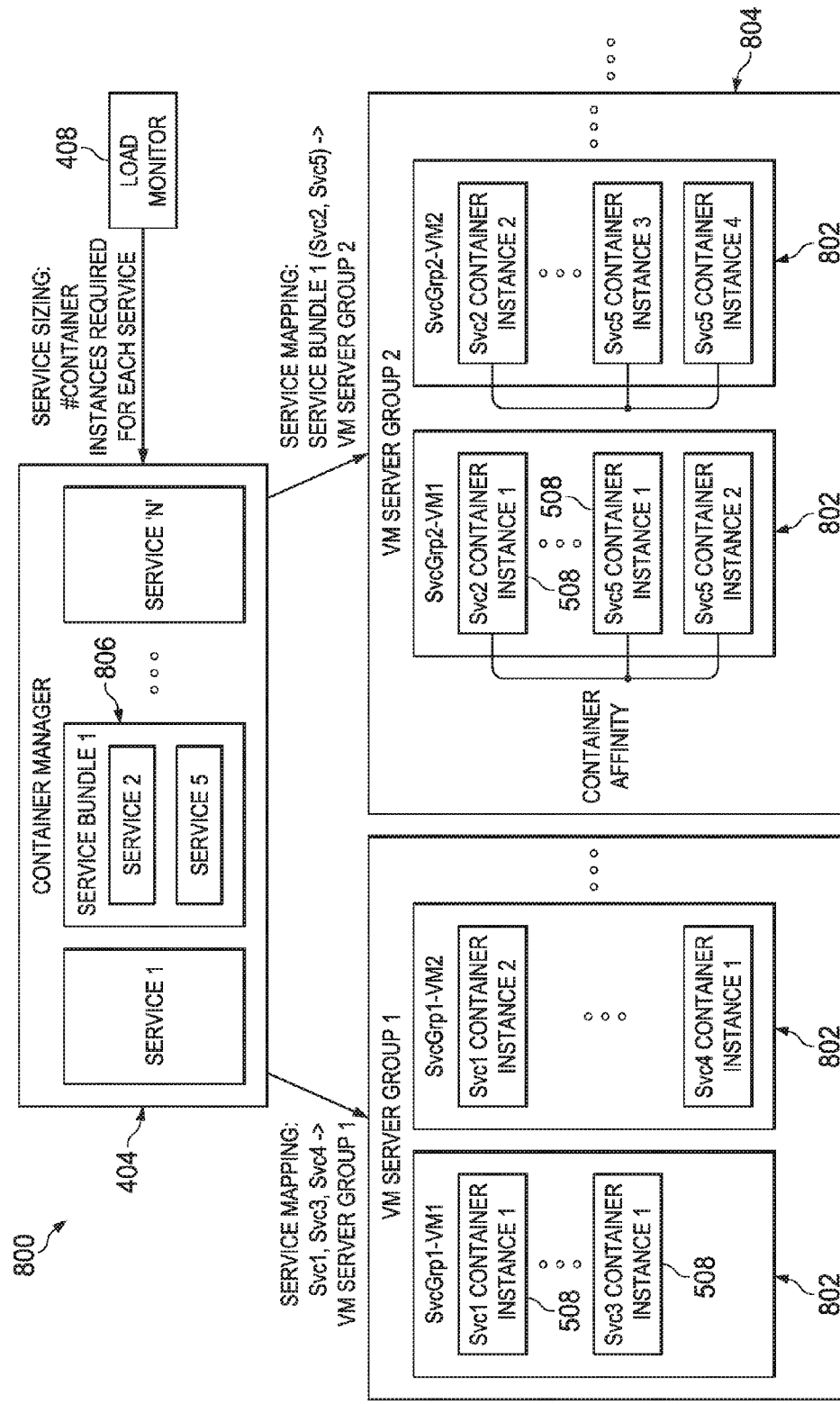
FIGS. 8 through 10 illustrate a block diagrams of a container management for the telecommunications services platform according to some embodiments.

FIG. 8 illustrates a block diagram 800 of mapping service containers to virtual machines 802 according to some embodiments. As illustrated by FIG. 8, virtual machines 802 are grouped into virtual machine server groups 804. Each virtual machine server group 804 may be tuned to provide specific platform characteristics to meet platform requirements of applications (e.g., services encapsulated on containers) running on virtual machines 802 belonging to a respective virtual machine server group 804. For example, virtual machine server group 804 include virtual machines 802, which each providing a specific platform characteristic, such as computer processing unit (CPU) resources, network interface resources, block storage type, block storage size, RAM resources, etc. The combination of platform characteristics provided by a virtual machine 802 may be referred to as a platform profile. Different virtual machine server groups 804 may have different platform profiles. When creating a new container instance, container manager 404 places the new container into a virtual machine 802 of an appropriate virtual machine server group 804 having a suitable platform profile for a service cluster to which the new container belongs. For example, container manager 404 maps the new container to a virtual machine 802 belonging to a virtual machine server group 804 having a platform profile providing resources matching a service provided by and/or expected resource usage of a service cluster to which the new container belongs. Within a virtual machine server group 804, container manager 404 may place a new container instance on a least loaded virtual machine 802. In some embodiments, container manager 404 may determine virtual machine loading for each virtual machine 802 based on platform metrics of the respective virtual machine 802. These platform metrics may include one or more of the following: CPU utilization, RAM utilization, disk utilization, network I/O throughput, disk I/O throughout, and the like. Thresholds for these platform metrics may tuned in accordance with each virtual machine server group 804.

Furthermore, is sometimes desirable to bundle containers belonging to two or more services into a service bundle (e.g., service bundle 806) and host the service bundle on a same virtual machine 802 to satisfy service constraints and/or improve service efficiency. For example, when is a high chance of intercommunication between containers of different services (e.g., a PTT call server and a PTT media server during a PTT call) one or more containers of each of the different services may be bundled together. Container manager 404 may map all containers belonging to a service bundle to a same virtual machine and ensure that a desired number of container instances within each service bundle are running at any given time (e.g., as specified by platform configuration).

In some embodiments, the telecommunications services platform (e.g., the PTT platform) may specify configurable thresholds for a minimum and/or a maximum number of container instances for each service to run simultaneously at a deployment site and/or across all deployment sites. In some embodiments, container manager 404 ensures that a minimum number of container instances are running for each service at any given time, and container manager 404 also ensures that the number of service containers for each service does not exceed a maximum threshold. Thus, a spurious spike on services may not cannibalize resources meant for other services.

In some embodiments, the platform is automatically scaled based on service metrics. For example, load monitor 408 uses one or more service metrics to determine the number of container instance required to serve the current load and provides ramp-up/ramp-down triggers to container manager 404. Container manager 404 may dynamically spin up and tear down service containers based on triggers provided by load monitor 408.

When removing service containers, container manager 404 may force the service containers into a 'drain' state. 'Drain' state is used in various embodiments to facilitate graceful shutdown, container migration, and auto-scale down. In the 'drain' mode, an application completes currently ongoing transactions and load balancers (e.g., load balancers 414a/414b, see FIG. 4) stops sending new transactions to the container instance. The application may also transfer long running sessions and pending tasks (e.g., Cron, etc) to other container instances. When a container is in the drain state, the container is given a set time period to complete and/or transfer current tasks to another container before the container is torn down. Thus, task migration may be smoothly handled while supporting container removal.

Furthermore, container manager 404 may enforce a ramp-down guard timer to ensure the service orchestration layer does not go into oscillation mode due to load fluctuations. For example, container manager 404 may start a ramp-down guard timer after completing a ramp-down, and container manager 404 may not initiate another ramp-down until the ramp-down guard timer expires. Thus, the ramp-down guard timer sets a minimum time between ramp-down periods.

In some embodiments, container manager 404 enforces anti-affinity rules to provide improved service capacity reliability. Container manager 404 may attempt to distribute the container instances belonging to a same service evenly across virtual machines 802 of a virtual machine server group 804 having a suitable platform profile. For example, when one or more container instances of a service are running on a first virtual machine, container manager 404 will only place an additional container instance of the same service on the first virtual machine if all other virtual machines in the virtual machine server group have an equal or greater number of container instances for the first service. Thus, failure of a virtual machine instance does not cause a disproportionate drop in the service capacity of a service.

In some embodiments, container manager 404 provides load skew correction. When services handle sticky sessions, there is a risk of imbalance in platform resource utilization across virtual machines 802 within a virtual machine server group 804. Thus, if one or more virtual machines 802 is getting overloaded (e.g., due to such load skew), container manager 404 may terminate one or more container instances on the overloaded virtual machine to automatically correct the load skew. Container manager 404 may then create new substitute container instances on other less loaded virtual machines 802.

Figure 9:
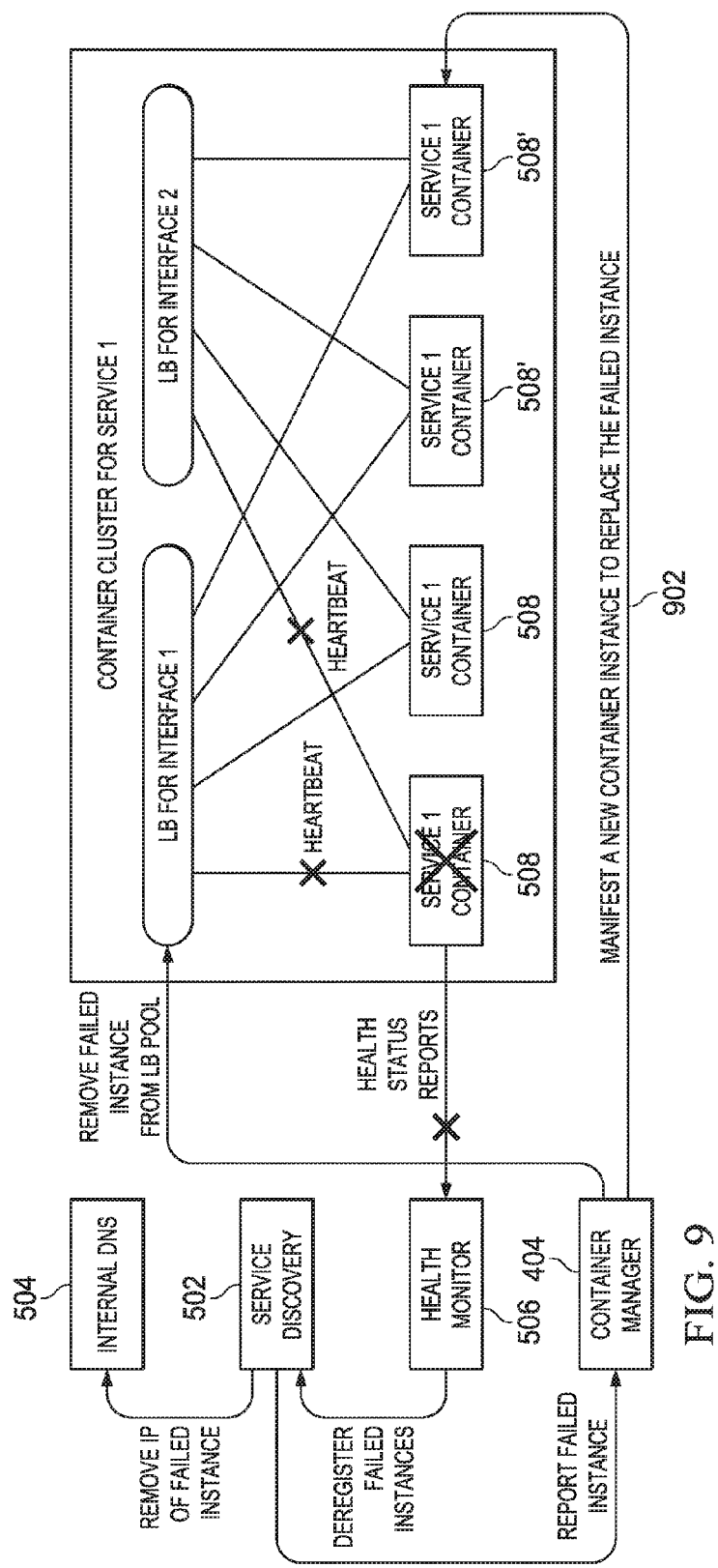

FIG. 9 illustrates container manager 404's response to a failed container instance. Container instance failure may be reported to container manager 404 as described above with respect to FIG. 7. In some embodiments, component failure (e.g., container instance failure) has minimal impact on the service logic. When a container fails, the service orchestration logic (e.g., through container manager 404) removes interface definitions and automatically replaces the failed component with a new container instance 508' as indicated by arrow 902. Several containers may fail at the same time (e.g., when a virtual machine 802 hosting the containers fails). Similarly, several virtual machines 802 may fail at the same time (e.g., when a physical host machine dies). All these events may manifest as a container failure to the service orchestration layer 202, and service orchestration layer 202 triggers recovery by instantiating new containers 508' and virtual machines to replace the failed instances. As long as there is sufficient redundancy in the physical infrastructure layer in terms of extra provisioned hardware, service capacity is not significantly diminished by platform component failure.

Figure 10:
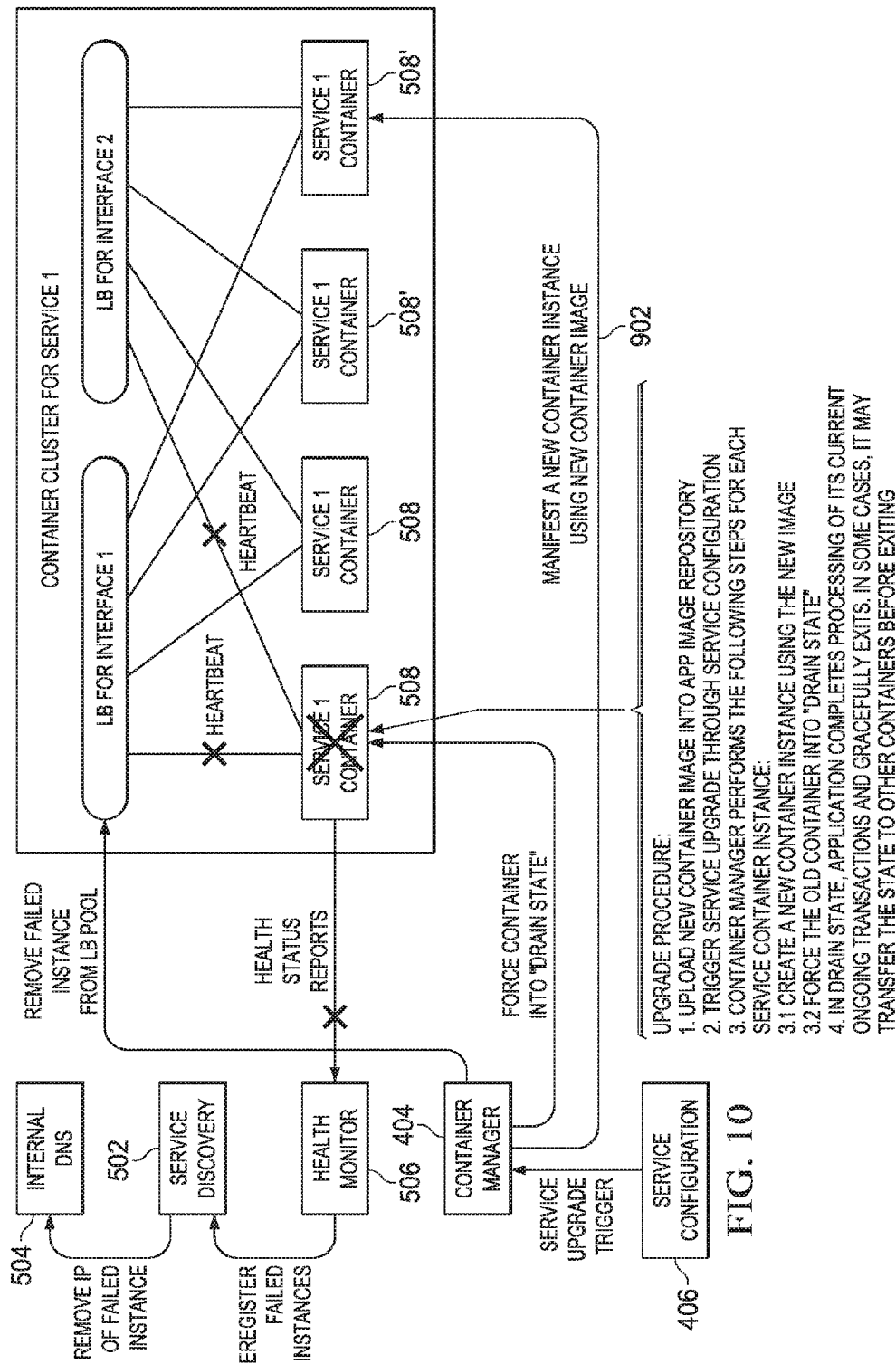

Furthermore, the above component failure procedure may be used to facilitate seamless (or at least less intrusive) rolling upgrades for the service containers as illustrated in FIG. 10. In some embodiments, container upgrades may begin by uploading an upgraded container image to an app image repository (e.g., app image repository 412). Service configuration module 406 may then trigger container upgrades by signaling container manager 404. Rolling upgrades may be implemented by forcing a service container 508 into a 'drain' state as described above. The container failure recovery logic then replaces the exiting container 508 (e.g., un-upgraded container 508) with a new container instance 508' using the upgraded container image.

An embodiment virtual infrastructure management layer 206 is described in greater detail with respect to FIGS. 11 and 12, below. Physical infrastructure for hosting a service can be provided by one or more cloud IaaS systems, which could span multiple datacenters (referred to as deployment sites) at different geographical sites. Virtual infrastructure management layer 206 provides an abstract interface to the physical cloud infrastructure and serves as the bridge between service orchestration layer 202/container management layer 204 and the physical infrastructure. Virtual infrastructure management layer 206 executes scaling triggers received from container management layer 204, and virtual infrastructure management layer 206 uses underlying cloud infrastructure management APIs (e.g. OpenStack) to build up compute nodes with a platform profile (e.g., a requested combination of CPU, RAM, storage and network IO capacity) requested by the container management layer 204.

Figure 11:
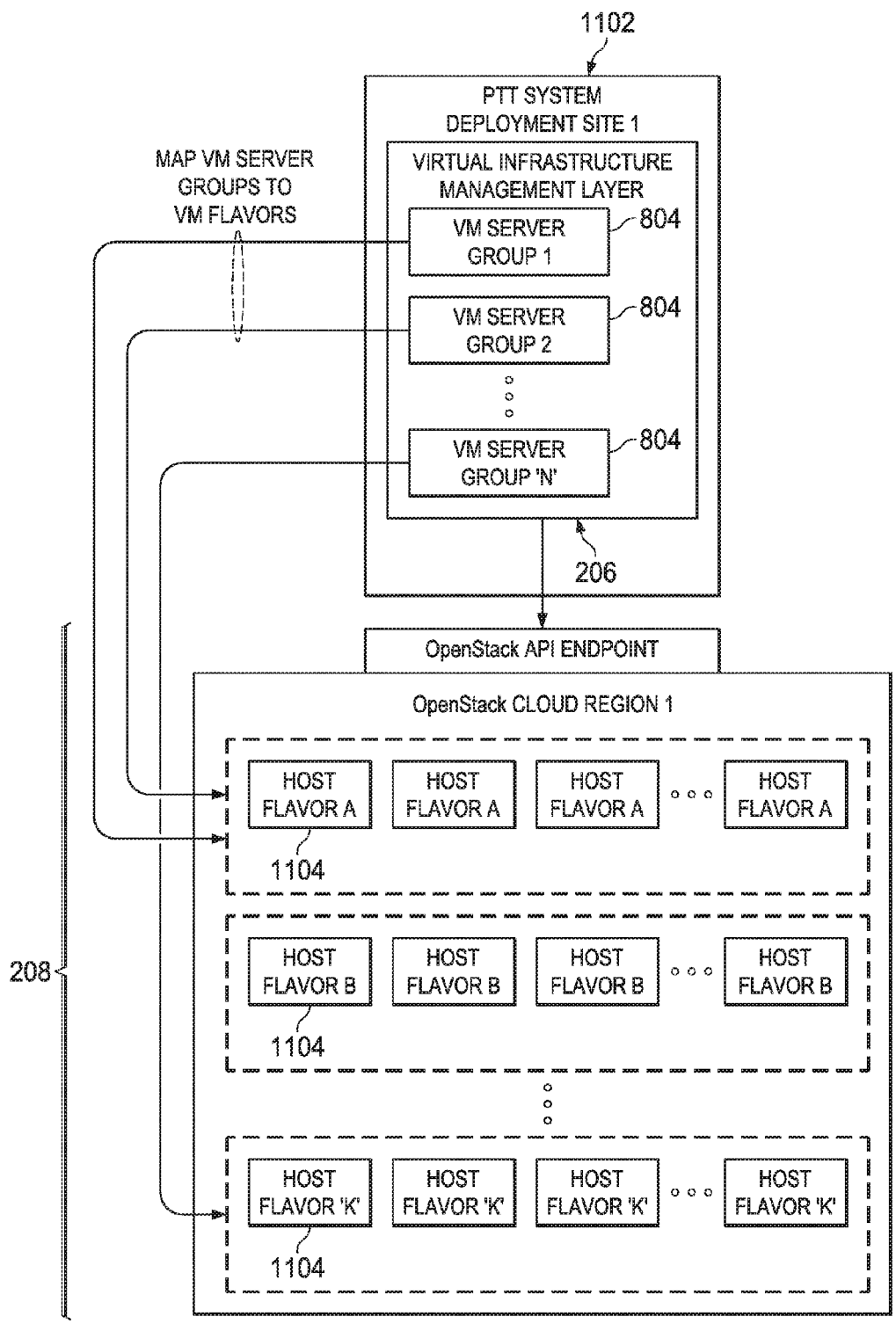
FIGS. 11 and 12 illustrate a block diagrams of a virtual machine management for the telecommunications services platform according to some embodiments.

Referring to FIG. 11, virtual machines are grouped in to virtual machine server groups 804 within a deployment site 1102. As described above, each virtual machine server group 804 is tuned to provide platform profiles for applications (e.g., services on containers) running on the virtual machines in the respective virtual machine server group 804. These platform profiles include parameters and resources such as CPU parameters, block storage parameters, network interface parameters, RAM parameters, combinations thereof, and the like.

In some embodiments, each service in the telecommunications services platform (e.g., a PTT system) is mapped to a specific virtual machine server group 804 based on a function provided by a respective service. For example, examples of virtual machine server groups 804 may include management server group, media server group, signaling server group, database server group, demilitarized zone (DMZ) server group, analytics server group, and the like. In such embodiments, each service cluster in the telecommunications services platform may be mapped to a different virtual machine server group 804.

In an embodiment system, a cloud provider (e.g., an OpenStack cloud provider) may offer host virtual machines 1104 of different flavors, wherein each flavor provides a combination of parameters (e.g., number/type of CPUs, number/type of network interfaces, block storage type, block storage size, RAM size, combinations thereof, and the like). These host virtual machines 1104 are instantiated, by the cloud network on physical host processors at deployment sites of physical infrastructure layer 208. Virtual machines 802 in each virtual machine server group 804 are mapped to host virtual machines 1104 with a flavor that matching (or most closely matching) a platform profile of a respective virtual machine server group 804. Thus, design time considerations of the telecommunications services platform may be decoupled from cloud network deployment concerns.

Furthermore, when adding a new virtual machine into a virtual machine server group 804, anti-affinity policies may be enforced by the physical infrastructure layer 208 (e.g., a IaaS layer). For example, the physical infrastructure layer may ensure virtual machine instances are spread across different host virtual machines 1104 for improved system resilience. When one host virtual machine 1104 fails, the service cluster may still be available. Host virtual machines 1104 are operated on the host physical processors in order to provide the functions of service clusters deployed on host virtual machines 1104.

Figure 12:
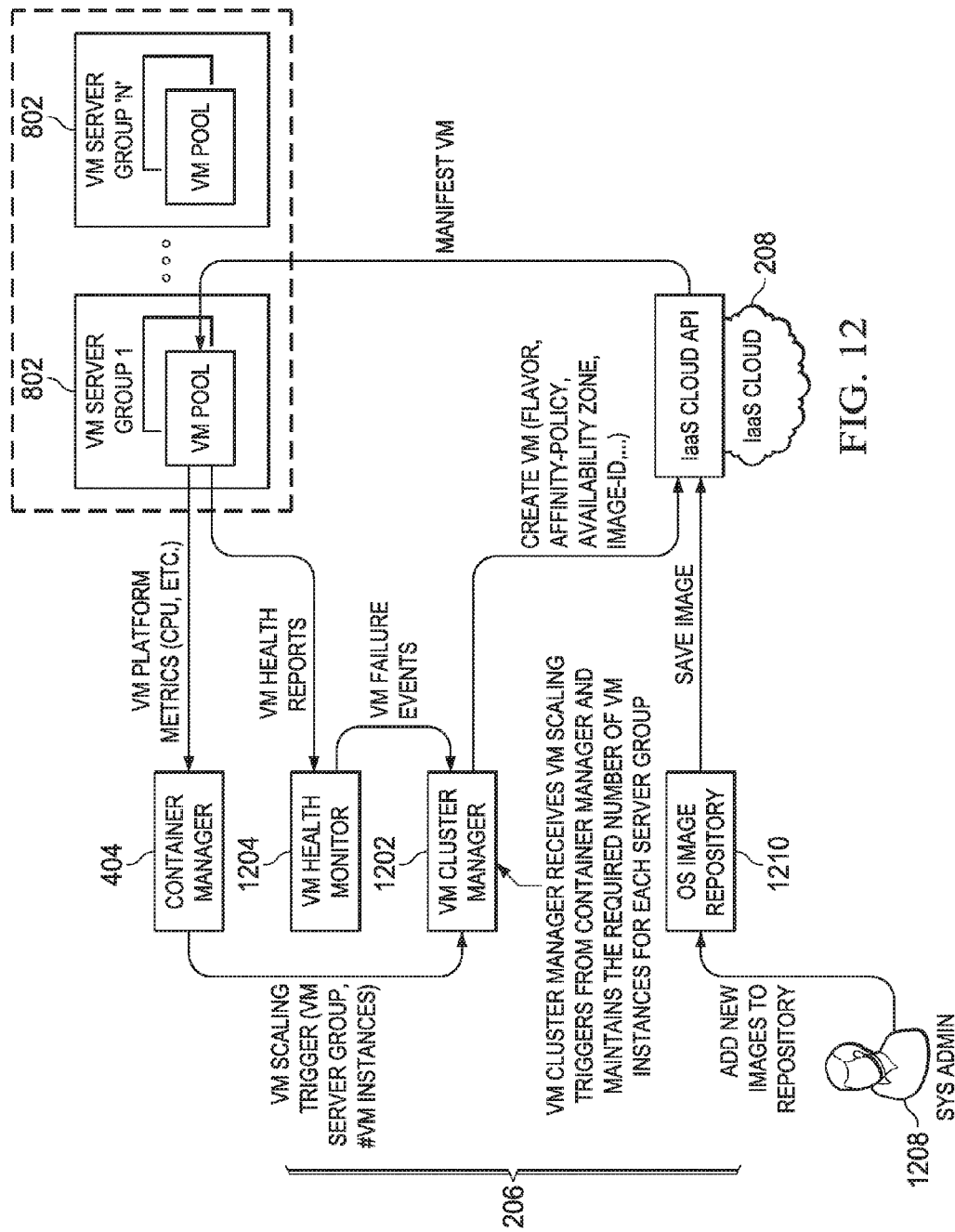

Referring to FIG. 12, virtual infrastructure management layer 206 includes a virtual machine cluster manager 1202 and a virtual machine health monitor 1204. virtual machine cluster manager 1202 maintains a suitable number of virtual machine instances for each virtual machine server group 804, for example, by signaling virtual machine creation triggers to the physical infrastructure layer 208 (e.g., signaling a IaaS cloud). In some embodiments, virtual machine cluster manager 1202 determines a number of virtual machine instances needed to each virtual machine server group 804 from virtual machine scaling triggers provided by container manager 404. In such embodiments, container manager 404 may determine the number of virtual machine instances needed based on desired platform characteristics signaled to container manager 404 from virtual machine server groups 804.

Virtual machine health monitor 1204 receives health reports from virtual machines in each virtual machine server group 804, and virtual machine health monitor 1204 notifies virtual machine cluster manager 1202 of failed virtual machine instances. Thus, virtual machine cluster manager 1202 may create replacement virtual machine instances based on detected virtual machine instance failure, for example by signaling physical infrastructure layer 208.

As further illustrated by FIG. 12, an operating system (OS) image repository 1210 in the telecommunications services platform (e.g., a PTT platform) keeps OS images that are used for spinning up virtual machines in various virtual machine server groups 804. When a new image is loaded to OS image repository 1210 by a system administrator (e.g., SysAdmin 1208), OS image repository 1210 will propagate the new image to an OpenStack image repository (e.g., Glance) in the cloud. When creating new virtual machines, virtual machine cluster manager 1202 indicates what image that should be used for the new virtual machines.

Regarding bootstrap, a minimal set of virtual machine instances required for hosting the management layer components (e.g., virtual machine cluster manager 1202 and service discovery) are created using cloud orchestration templates, for example.

In some embodiments, the container-based environment described above is used to provide an elastic scalability model for PTT systems. As described earlier, service components are implemented as a cluster of application server containers, and the service load is distributed among various cluster elements. Various embodiments may support load balancing for different types of traffic in an embodiment telecommunications system. In various embodiments, application servers may receive one or more of the following types of traffic through one or more interfaces: client/user initiated traffic, peer-to-peer traffic across various components, and asynchronous tasks. Client/user initiated traffic may include long sessions such as POC pre-established sessions, short sessions such as PTT calls, transactional load traffic (e.g., data management, presence state updates, etc.), combinations thereof, and the like. Peer-to-peer traffic may include traffic between different service components (e.g., between different service clusters, such as between a presence service and a notification service as part of the service execution flow), between same components (e.g., between a same service cluster) to transmit information across stateful sessions managed by different instances (e.g. a PTT call between two clients whose POC pre-established sessions are connected to different PTT servers), combinations thereof, and the like. Asynchronous tasks may include session refresh/expiry, data audits, combinations thereof and the like.

Figure 13:
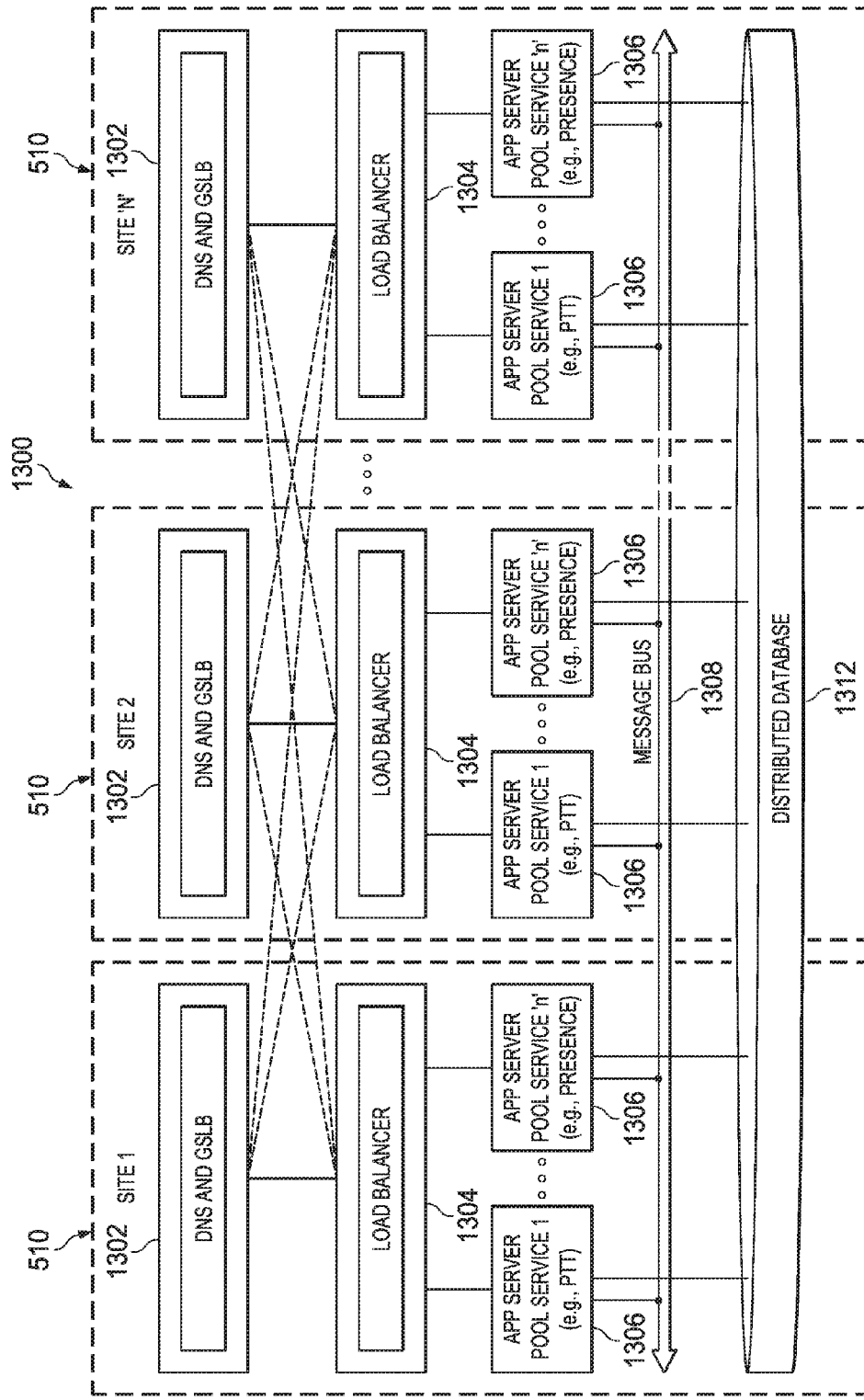
FIG. 13 illustrates a block diagrams of a load balancing peer-to-peer traffic for the telecommunications services platform according to some embodiments.

FIG. 13 illustrates a load balancing model 1300 for the client/user initiated traffic in an embodiment PTT system. In an embodiment, all traffic originating from outside the PTT system may first be dynamically distributed across multiple deployment sites 510, which may be achieved using DNS based global server load balancing (GSLB). As part of service configuration, PTT clients are provided FQDNs to address various services provided by the PTT system. A DNS-GSLB 1302 at each deployment site 510 serves as the domain authority for these FQDNs. On performing a DNS query for these FQDNs, DNS-GSLB 1302 returns an IP address selected for the PTT client based on a configured geographical load distribution policy. In an embodiment, the geographical load distribution policy may be based on geographic proximity. For example, DNS-GSLB 1302 can be configured to direct the traffic to a geographically nearest deployment site 510 based on an originator's IP address. In another embodiment, the geographical load distribution policy may be based on a weighted round robin policy. For example, DNS-GSLB distributes the traffic to various deployment sites 510 in the proportion of the weightage assigned to each site. In an embodiment a weight assigned to each of the plurality of geographically diverse deployment sites 510 is proportional to an available spare load bearing capacity of a respective one of the plurality of geographically diverse deployment sites. In such embodiments, some deployment sites 510 may be larger than the other deployment sites 510. Other load distribution policies may also be used in other embodiments.

In some embodiments, the DNS query is performed based on the system receiving a SIP REGISTER request from a PTT client for a PTT session. Once a deployment site 510 is selected for serving the SIP REGISTER request from a PTT client, that deployment site 510 is considered the 'home' site for the duration of the session with the PTT client. In some embodiments, all services used by the client are provided from the same home site, and a SIP path information may be returned in a REGISTER response to the requesting PTT client. The PTT client uses this SIP path information to direct all subsequent SIP service requests to the home site. Similarly, a PTT client may be provided site specific route information as part of the login session establishment procedure for other services.

Within each deployment site, all service requests from PTT clients are directed through load balancers 1304, which distributes traffic to corresponding service clusters 1306. As described above, each service cluster 1306 includes one or more containers and may provide a different PTT service. Application servers on service clusters 1306 may communicate and share information using a common message bus 1308 and distributed database 1310. Load balancers 1304 support server stickiness for session based workloads such as POC pre-established sessions, chat group sessions, subscribe dialogs etc. For example, load balancers 1304 may keep session based workloads on a same server instance (e.g., a same container instance) when possible. Transactional workloads such as messaging, presence updates, and the like may be equally distributed across service clusters 1306.

Unlike load balancing for PTT client-initiated traffic where a load balancing proxy component serves as the entry point for session requests, one or more different load balancing strategies may be used for internal traffic between various elements within a service cluster and between different service clusters. The load balancing strategies used by various service components for this type of traffic may include a load balancer proxy, an internal DNS round robin, load balancing through messaging middleware, or a combination thereof. An embodiment load balancer proxy may be similar to the PTT client traffic load balancing scheme described above with respect to FIG. 5. Traffic is routed through a load balancing proxy, which distributes the traffic to pool members of the service cluster and also implements session stickiness if desired for that service.

In another embodiment, an internal DNS round robin load balancing scheme is used for internal traffic. In this scheme, each service cluster in the PTT platform is provided with unique deployment site level FQDNs. An example format for the site level FQDNs may be: "site1.svc1.kptt-int.com". As part of service registration procedure, a new container associates its interface IP address with the FQDN of the container's service cluster. Thus, the new container element becomes visible to other service elements (e.g., other service clusters), and the container will receive a proportionate share of the peer-to-peer traffic through DNS round robin. For example, when a component wishes to send a message to a peer component, the component queries an internal DNS (e.g., internal DNS 504, see FIG. 6) to obtain a list of active IPs for that service and randomly picks one of the IP addresses from the returned pool of IPs. A service discovery module (e.g., service discovery module 402) may automatically remove the IPs of failed components from the internal DNS and ensures that no traffic is directed towards an unresponsive or failed component.

In another embodiment, load balancing through middleware is used for internal traffic. Load balancing through messaging middleware may include service components using a distributed message oriented middleware to obtain benefits of load balancing logic provided by a message bus. A service cluster element (e.g., service containers) binds to a share message queue, and the messaging middleware distributes traffic to various elements. If some elements are lagging, the lag may manifest as a growing queue size, and the messaging middleware may automatically throttle the traffic directed towards that element until the queue size is reduced.

An embodiment PTT platform may further include an asynchronous task scheduler, which service cluster elements (e.g., service containers) use to schedule tasks for execution at a later time. When the task is due for execution, the task may or may not be taken by a same service element that initially scheduled the task. For example, the element that originally scheduled the task may no longer be available, and the service orchestrator has substituted the failed element with a new element.

In various embodiments, any service element capable of performing the scheduled task may take the task from the asynchronous task scheduler. The asynchronous task scheduler may distribute scheduled tasks by submitting task details to a suitable service cluster (e.g., using messaging middleware). Thus, the load balancing capability of the messaging middleware may be used for asynchronous task load balancing as well.

In various embodiments, service cluster elements (e.g., containers) may report various metrics for elastic scalability. For example, these metrics may include platform metrics, such as CPU usage, RAM usage, network I/O usage of a compute node hosting the service cluster element. Service cluster elements in a PTT system may be limited by other service specific capacity constraints. For example, each service component may identify such constraints and implements metrics to report the utilization of these service resources. Indicators of service capacity may include one or more of the following: number of PTT pre-established sessions, PTT call setup rate, PTT call leg setup rate, number of concurrently active PTT calls, number of concurrently active PTT call legs, number of media codec instances in active use, and the like. A service orchestrator may use these service capacity indicators (sometimes referred to as service metrics) to scale service clusters accordingly as described above with respect to FIG. 2.

Figure 14:
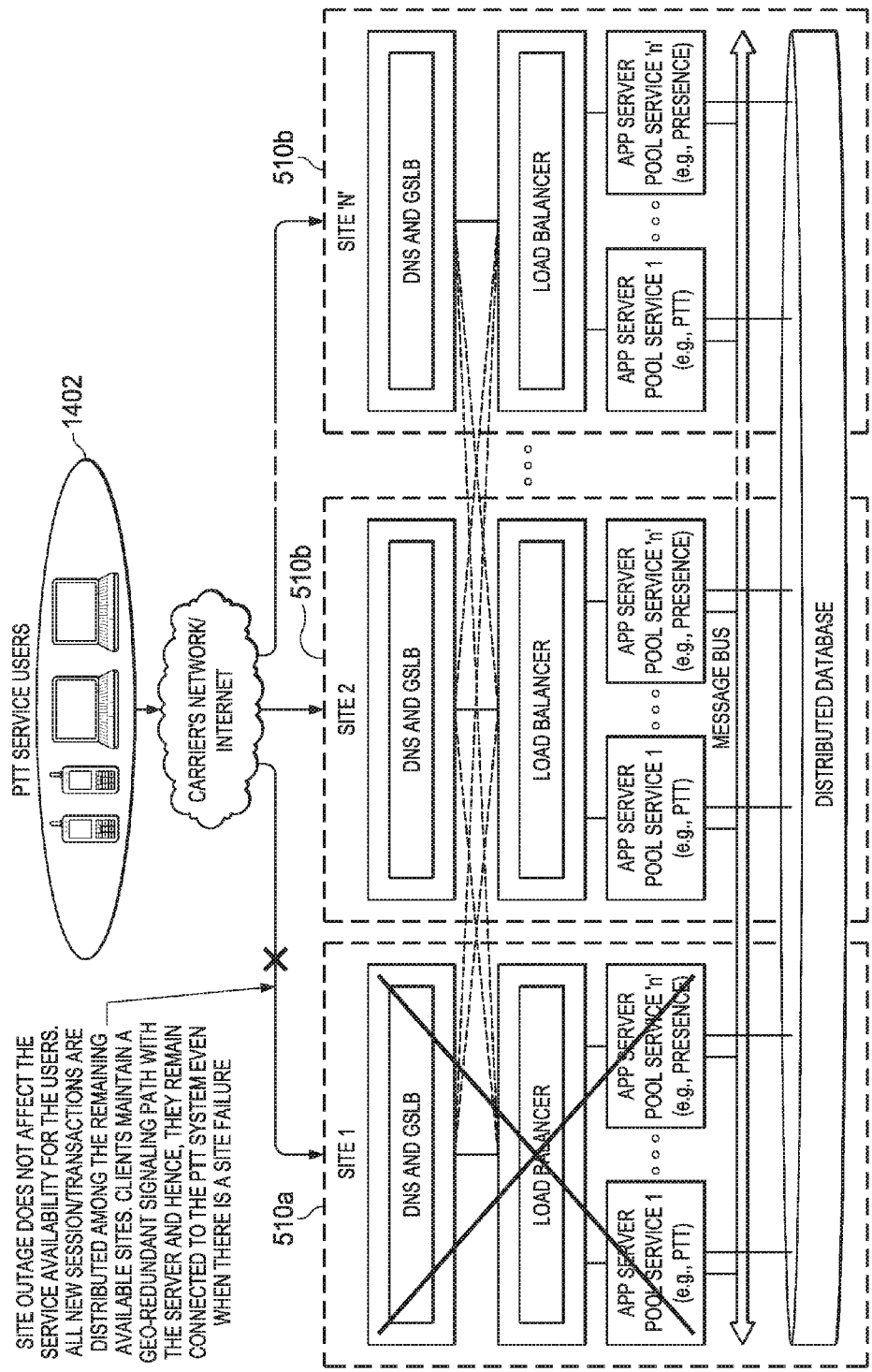
FIG. 14 illustrates a block diagrams of handling deployment site failure for the telecommunications services platform according to some embodiments.

Various embodiment telecommunications systems (e.g., a PTT system) may be equipped to handle deployment site failure. For example, disaster situations can cause an entire deployment site to go down. From the service user's perspective, even full site outage may not significantly affect the service availability. When a deployment site is taken out completely (e.g., deployment site 510*a* in FIG. 14), service traffic is distributed among the other available deployment sites (e.g., deployment sites 510*b* in FIG. 14). Hence, a site outage merely manifests as additional traffic on the remaining sites 510*b* and does not manifest as complete service failure. An embodiment elastic scaling architecture of the telecommunications services system (e.g., the PTT system) is equipped to handle site failure. In some embodiments, service users (e.g., users 1402 through PTT clients) maintains simultaneous signaling paths with geographically redundant deployment sites so that the users remain connected to the telecommunications services system when a site failure occurs. For example, the user may simultaneously maintain a first signaling path with a first deployment site and a second signaling path with a second deployment site. When the first deployment site fails, the user transfers active sessions through the second signaling path to the second deployment site. These connections may be referred to as geographically redundant signaling paths and allow users to maintain service even during deployment site failure.

Figure 15:
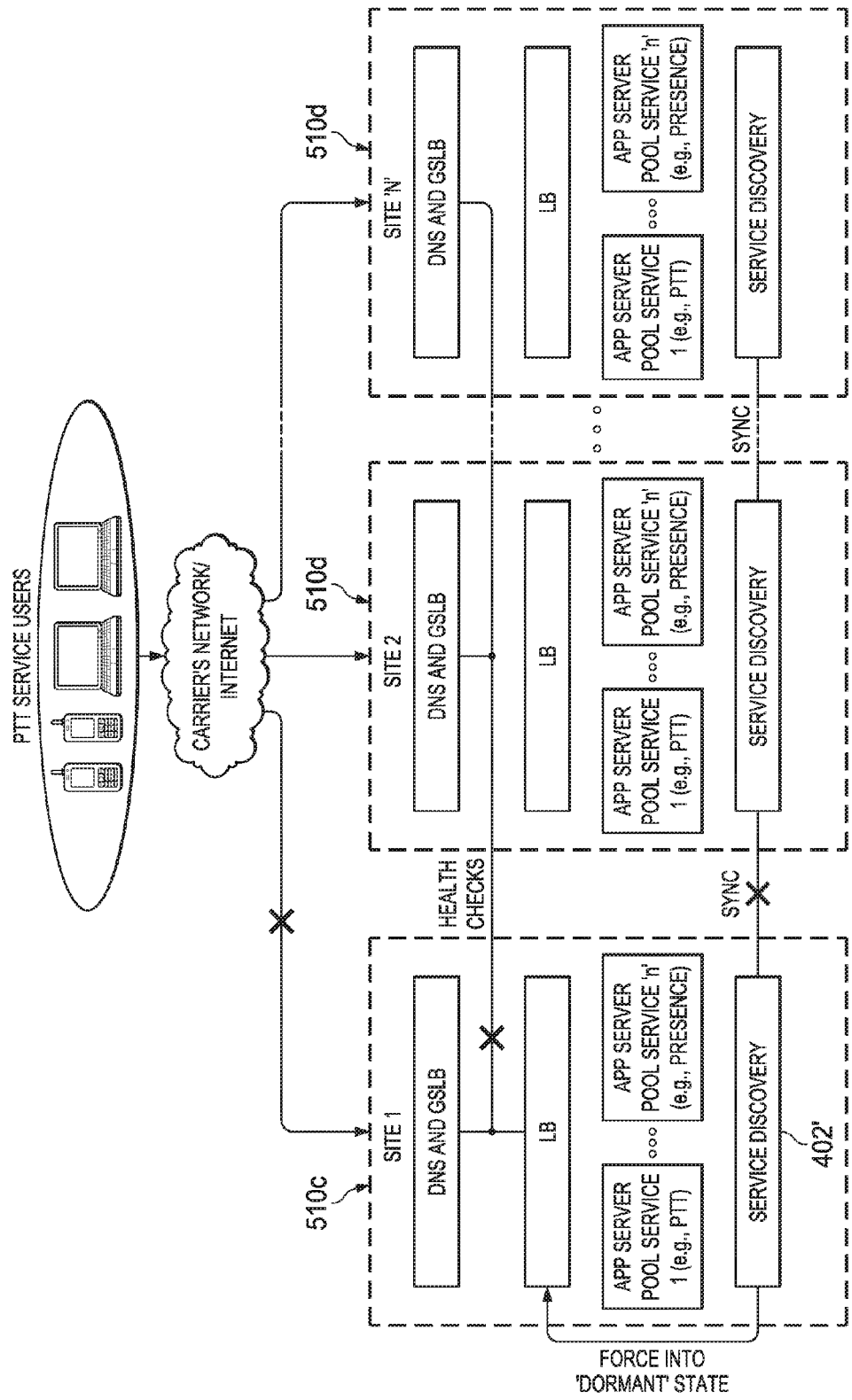
FIG. 15 illustrates a block diagrams of handling deployment site partition for the telecommunications services platform according to some embodiments.

Various embodiment telecommunications systems (e.g., a PTT system) may be equipped to handle network partitioning. Network partitioning occurs when one or more deployment sites are isolated from the rest of the telecommunications system. FIG. 15 illustrates a block diagram of a telecommunications system when network partitioning occurs. In FIG. 15, the system has been partitioned. For example, deployment site 510*c* is isolated from deployment sites 510*d*. When the network gets partitioned, a service discovery component 402' at deployment site 510*c* identifies whether deployment site 510*c* is connected to a majority of the deployment sites (referred to as a majority group). In some embodiments, service discovery component 402' determines when a partition has occurred when service discovery component 402' loses connectivity with peer service discovery components at other deployment sites. If service discovery component 402' determines deployment site 510*c* connected to a minority of deployment sites, service discovery component 402' will automatically force deployment site 510*c* to become dormant. While deployment site 510*c* is dormant, user traffic is redirected to other deployment sites (e.g., sites 510*d*) belonging to the majority group.

Depending on the level of redundancy desired, the network can be engineered to tolerate a 'K' partition by adding sufficient additional capacity at various deployment sites. For example, when K deployment sites fail simultaneously, the traffic handled by these K failed sites is redistributed equally among the remaining (N−K) deployment sites, where K is the number of sites that are allowed to fail simultaneously under the specified level of redundancy and N is the total number of deployment sites. In order to provide redundancy, each deployment site is dimensioned to handle a load of $$L \times \left(1 + \frac{K}{N-K}\right),$$

where L represents the amount of traffic that each deployment site is expected to serve when all N sites are available. The network may further provide redundant network topology in which deployment sites are connected to each other through multiple paths in order to reduce partitioning.

Figure 16:
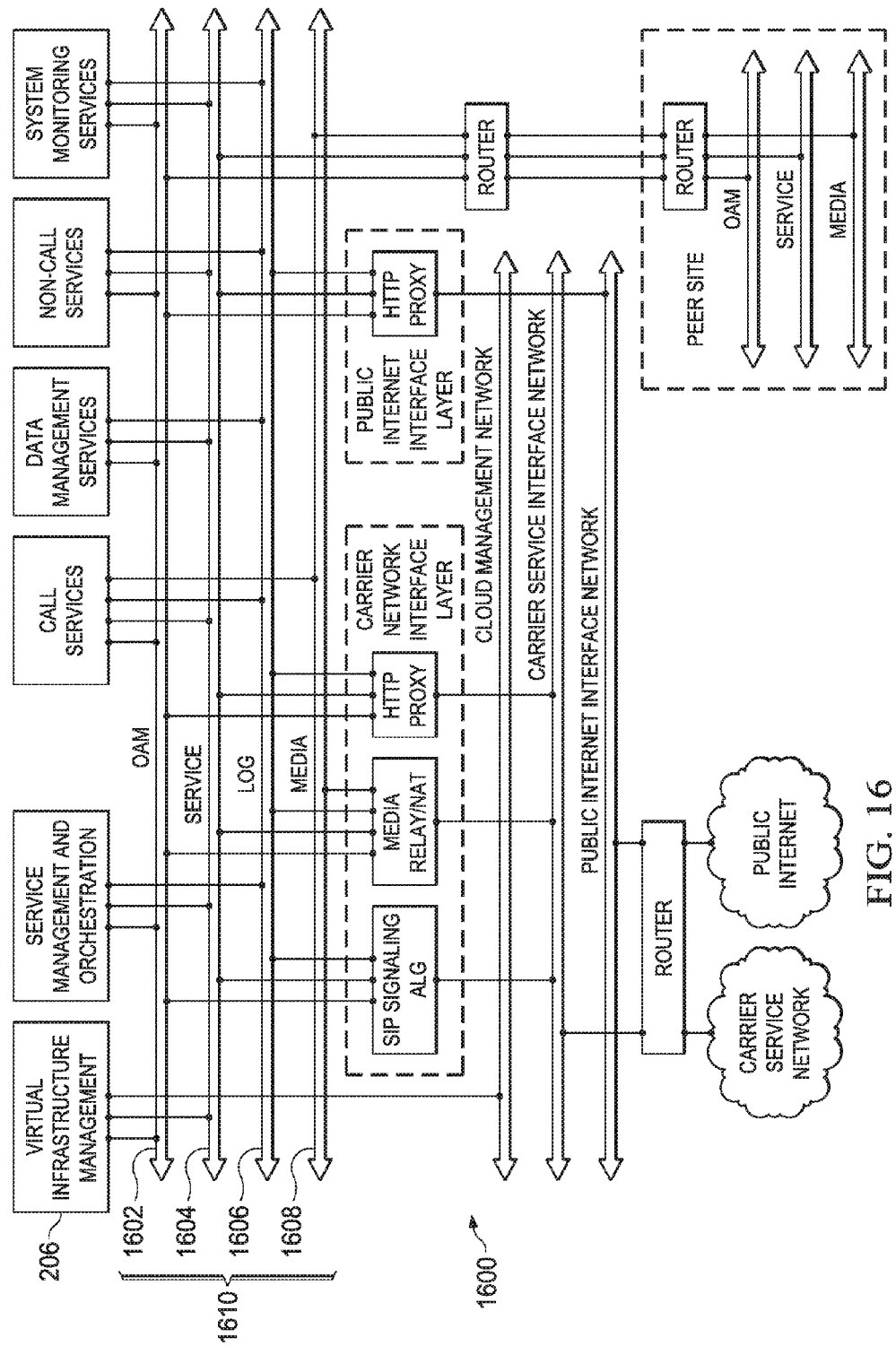
FIGS. 16 and 17 illustrate block diagrams of software defined networks (SDNs) traffic for the telecommunications services platform according to some embodiments.

FIG. 16 illustrates an abstract network model 1600 for an embodiment PTT system. As illustrated by FIG. 16, the PTT system may include different types of network traffic, such as operations, administration, and management (OAM, sometimes referred to as operations, administration, and maintenance) plane traffic 1602, service plane traffic 1604, log plane traffic 1606, and user media plane traffic 1608. The various different planes of network traffic collectively referred to as SDNs. Various components/services (e.g., as encapsulated in containers) in the PTT system may access different types of network traffic through different virtual network ports. For example, virtual infrastructure management accesses OAM plane traffic and log plane traffic; service management and orchestration accesses OAM plane traffic, service plane traffic, and log plane traffic; call services access OAM plane traffic, service plane traffic, log plane traffic, and user media plane traffic; data management services access OAM plane traffic, service plane traffic, and log plane traffic, non-call services access OAM plane traffic, service plane traffic, and log plane traffic; system monitoring services access OAM plane traffic, service plane traffic, and log plane traffic. The various network traffic types accessible to such services may depend on the type of service.

Figure 17:
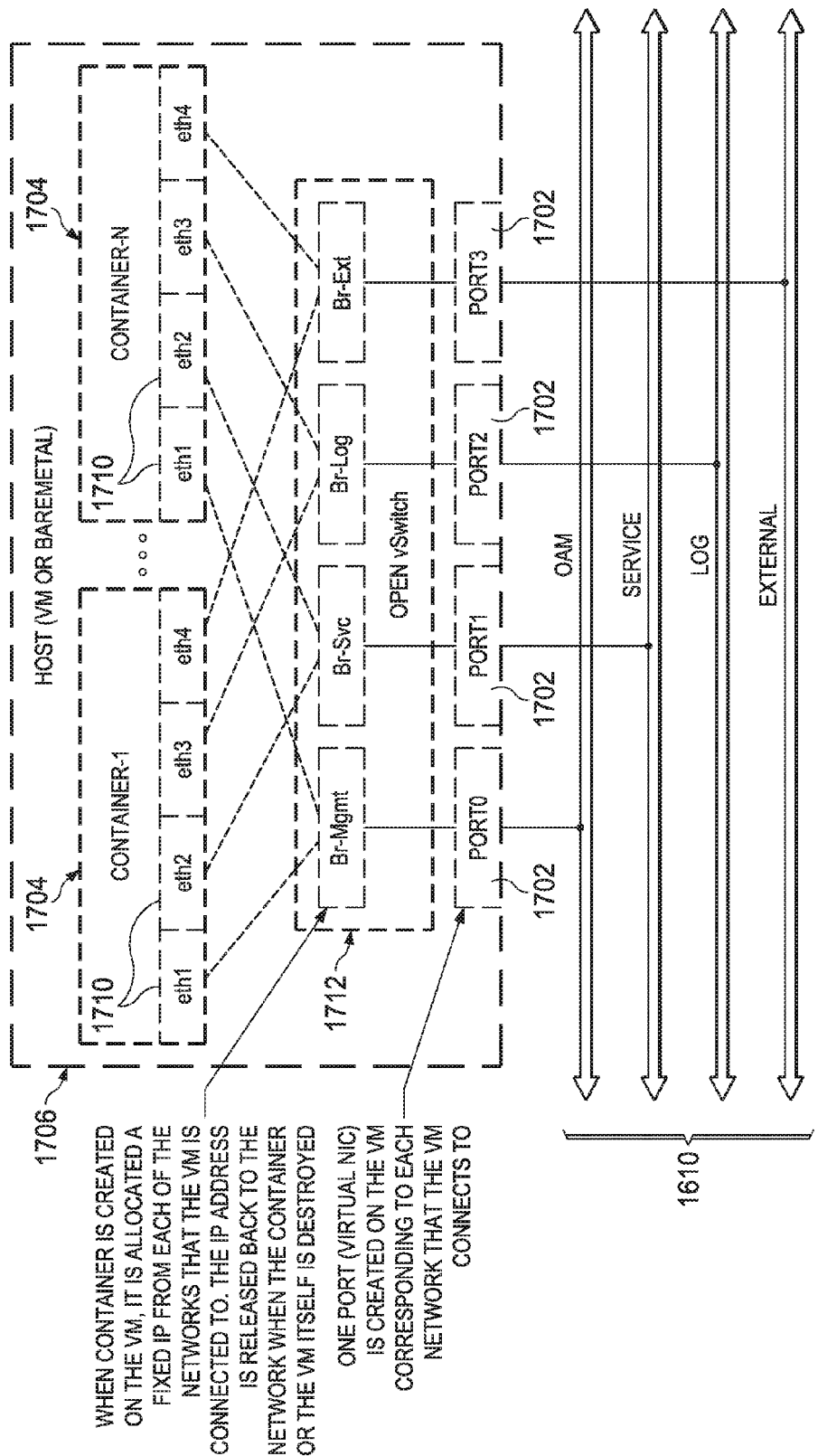

In various embodiments, virtual network ports of containers (e.g., service containers and management containers encapsulating various service/management layers in the PTT system) are used to segregate different types of network traffic received from each plane (also referred to as networks of SDN 1610). These virtual network ports are connected to network ports of a host, that the container is deployed on as illustrated by FIG. 17. For example, container network ports 1710 of containers 1704 are connected to host network ports 1702. When a container 1704 is created on a host 1706 (e.g., a host virtual machine or baremetal), the container 1704 is allocated a fixed IP from each network (e.g., SDNs 1610) connected to host 1706. Virtual switches 1712 may be used to route traffic between container network ports 1710 and host network ports 1702 using these IP addresses. These IP addresses may be released back to the network when the container 1704 or host 1706 is destroyed. One port 1702 is created on the host 1706 for each network (e.g., SDNs 1610) connected to host 1706. The mapping of virtual ports used by a container to host network ports may depend on the availability of multiple virtual network interfaces (vNICs) on the flavor of virtual machine hosting the container as provided by the cloud network.

Thus, as described above a telecommunications services platform uses containers to virtualize services provided by the telecommunications services platform. Various management layers (e.g., a service orchestrator, container manager, and virtual infrastructure manager) deploy containers and provide elastic scaling of containers and virtual machines hosting the containers. The management layers further map virtual machines to host virtual machines provided by an embodiment cloud network, and the host virtual machines are deployed on physical compute nodes at geographically redundant deployment sites for improved system resilience. The cloud network may be independent from or a dedicated entity for the telecommunications services platform. Thus, a flexible, scalable system may be deployed to provide various telecommunications services (e.g., PTT), and service deployment may be decoupled from physical infrastructure deployment.

Figure 18:
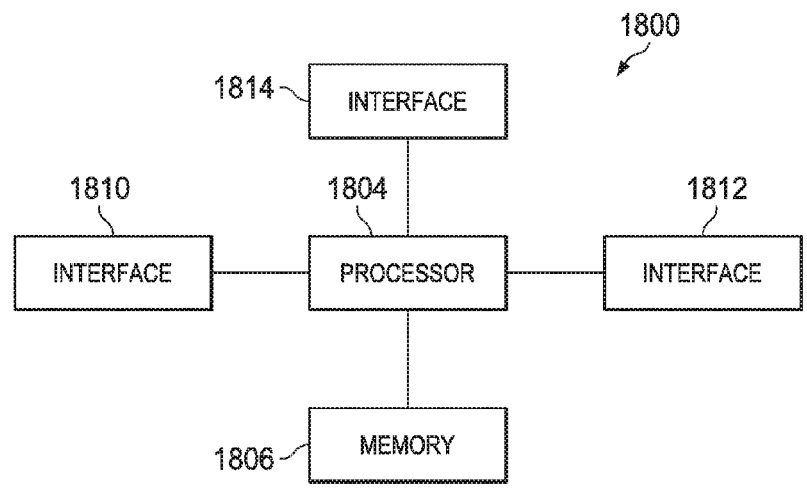
FIG. 18 illustrates a diagram of an embodiment processing system.

FIG. 18 illustrates a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 18. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1100 may include additional components not depicted in FIG. 18, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
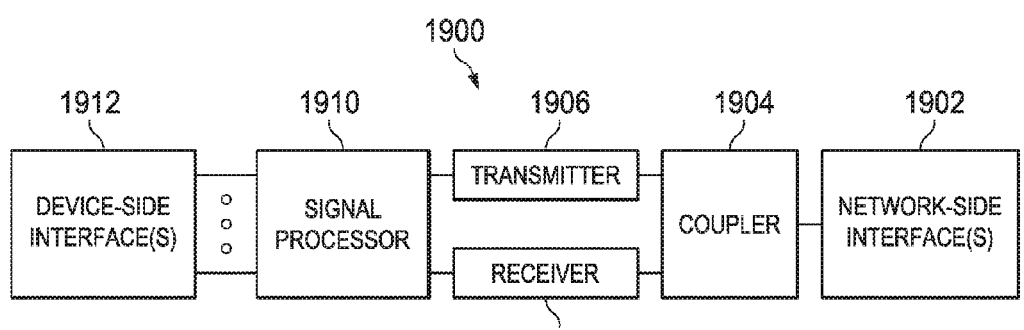
FIG. 19 illustrates a diagram of an embodiment transceiver.

In some embodiments, one or more of the interfaces 1810, 1812, 1814 connects the processing system 1800 to a transceiver adapted to transmit and receive signaling over the telecommunications network. FIG. 19 illustrates a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and a device-side interface 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1100, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment, a method includes triggering, by a service orchestrator hosted on a processor, creation of one or more container instances for a first service cluster. The first service cluster provides a first service for a telecommunications services platform. The method further includes creating, by a container manager hosted on a processor, the one or more container instances and mapping, by the container manager, the one or more container instances of the first service cluster to one or more first virtual machines belonging to a first virtual machine server group in accordance with a platform profile of the first virtual machine server group and the first service provided by the first service cluster. The method further includes mapping, by a virtual machine manager hosted on a processor, the one or more first virtual machines to one or more first host virtual machines of a cloud network in accordance with the platform profile of the first virtual machine server group. The method further includes deploying the one or more first host virtual machines on one or more host processors.

In accordance with an embodiment, the platform profile includes computer processing unit (CPU) parameters, network interface parameters, block storage parameters, random access memory parameters, or a combination thereof provided by each of the one or more first virtual machines belonging to the first virtual machine server group.

In accordance with an embodiment, the method further includes registering the one or more container instances with a service registrar and adding, by the service registrar, internet protocol (IP) addresses for interfaces of the one or more container instances with a domain name system (DNS). The IP addresses for the interfaces of the one or more container instances are each in accordance with a fully qualified domain name (FQDN) of the first service, and the interfaces of the one or more container instances are discoverable by other components of the telecommunications services platform by performing a DNS search on the FQDN. In an embodiment, the method may further include restricting discovery of the interfaces of the one or more container instances to components of the telecommunications services platform deployed on processors located at a same deployment site as the one or more host processors. In another embodiment, the other components of the telecommunications services platform are deployed across all deployment sites of the telecommunications services platform.

In accordance with an embodiment, the method further includes ensuring, by the container manager, at least a minimum number of virtual machines are available in the first virtual machine server group for the first service cluster.

In accordance with an embodiment, mapping the one or more container instances to the one or more first virtual machines includes mapping the one or more container instances to the one or more first virtual machines in accordance with an anti-affinity policy. In an embodiment, the anti-affinity policy includes mapping a first one of the one or more container instances to a first one of the one or more first virtual machines and mapping a second container instance of the first service cluster to the first one of the one or more first virtual machines only when all virtual machines belonging to the first virtual machine server group host at least as many container instances for the first service cluster as the first one of the one or more first virtual machines.

In accordance with an embodiment, the method further includes bundling a first one of the one or more container instances with a second container instance and mapping the second container instance to a same one of the one or more first virtual machines as the first one of the one or more container instances. The second container instance belongs to a different service cluster than the first service cluster. The different service cluster provides a second service for the telecommunications services platform different than the first service.

In accordance with an embodiment, the method further includes triggering, by the service orchestrator, a ramp down of container instances in accordance with one or more service metrics of the telecommunications services platform and removing, by the container manager, one or more second container instances in accordance with a ramp down trigger received from the service orchestrator. In an embodiment, the method further includes forcing, by the container manager, the one or more second container instances into a drain state before removing the one or more second container instances and after receiving the ramp down trigger. In an embodiment, a container completes ongoing transactions or transfers sessions and pending transactions to a different container when the container is in the drain state. A load balancer stops sending new transactions to the container when the container is in the drain state. In accordance with an embodiment, the method further includes forcing, by the container manager, a container instance into the drain state when the container manager updates the container instance. In accordance with an embodiment, the method further includes setting, by the container manager, a ramp down guard timer when the one or second container instances are removed and not removing, by the container manager, any additional container instances in accordance with another ramp down trigger until the ramp down guard timer expires.

In accordance with an embodiment, the method further includes determining, by the container manager, when a first one of the one or more first virtual machines is overloaded due to load skew, removing, by the container manager, a first one of the one or more container instances on the first one of the one or more first virtual machines, and creating, by the container manager, a replacement container instance for the first service cluster on a different virtual machine belonging to the first virtual machine server group to replace the first one of the one or more container instances.

In accordance with an embodiment, the method further includes grouping virtual machines in the telecommunications services platform into virtual machine server groups in accordance with platform parameters provided by each of the virtual machines. Each virtual machine server group has a different platform profile. In an embodiment, each service provided by the telecommunications services platform is mapped to a different virtual machine server group.

In accordance with an embodiment, mapping the one or more virtual machines to one or more host virtual machines of a cloud network in accordance with the platform profile of the first virtual machine server group comprises mapping the one or more virtual machines to one or more host virtual machines providing platform characteristics best matching the platform profile of the first virtual machine server group compared to other types of host virtual machines provided by the cloud network.

In accordance with another embodiment, a method includes triggering, by a processor, creation of one or more container instances for a first service cluster. The first service cluster is one of a plurality of service clusters in a push-to-talk (PTT) platform, and each of the plurality of service clusters provides a different function for the PTT platform. The method further includes creating, by a processor, the one or more container instances and mapping, by a processor, the one or more container instances of the first service cluster to one or more first virtual machines belonging to a first virtual machine server group in accordance with a platform profile of the first virtual machine server group and a first PTT function provided by the first service cluster. The method further includes mapping, by a virtual machine manager hosted on a processor, the one or more virtual machines to one or more first host virtual machines of a cloud network in accordance with the platform profile of the first virtual machine server group. The cloud network is deployed independently from the PTT platform. The method further includes operating the one or more first host virtual machines on one or more host processors to provide the first PTT function for the PTT platform.

In accordance with an embodiment, the method further includes directing traffic originating from a PTT client on a user equipment (UE) to a deployment site in accordance with a geographic proximity of the deployment site to the UE.

In accordance with an embodiment, the method further includes traffic originating from a PTT client on a user equipment (UE) to a deployment site in accordance with a weighted round-robin load balancing policy.

In accordance with an embodiment, the method further includes receiving a registration request from a PTT client on a user equipment (UE) and selecting a deployment site for the registration request. All subsequent session initial protocol (SIP) service requests for the PTT client are directed to the deployment site.

In accordance with an embodiment, the method further includes supporting, by a load balancer hosted on a processor, container instance-stickiness for session based workloads of a PTT client on a user equipment (UE).

In accordance with an embodiment, triggering the creation of one or more container instances for a first service cluster is in accordance with one or more service metrics. The one or more service metrics comprises number of push-to-talk (PTT) pre-established sessions, PTT call setup rate, PTT call leg setup rate, number of concurrently active PTT calls, number of concurrently active PTT call legs, number of media codec instances in active use, or a combination thereof.

In accordance with an embodiment, the method further includes maintaining a first signaling path between a PTT client on a user equipment (UE) and a first deployment site of the PTT platform, maintaining a second signaling path between the PTT client and a second deployment site of the PTT platform. The first signaling path and the second signaling path are maintained simultaneously, and the first deployment site is at a different geographic location than the second deployment site. In accordance with an embodiment, the method further includes transferring active sessions of the PTT client using the second signaling path when the first deployment site fails.

In accordance with an embodiment, the method further includes detecting, by a service discovery mechanism, a first deployment site of the PTT platform is partitioned from one or more second deployment sites of the PTT platform, determining, by the service discovery mechanism, one or more third deployment sites connected the first deployment site after the first deployment site is partitioned, and forcing, by the service discovery mechanism, the first deployment site into a dormant state when the one or more third deployment sites and the first deployment site do not account for a majority of deployment sites in the PTT platform.

In accordance with an embodiment, the method further includes transferring traffic from the first deployment site to the one or more second deployment sites when the first deployment site is in the dormant state.

In accordance with yet another embodiment, a telecommunications services platform including: one or more processors and one or more computer readable storage mediums storing programming for execution by the one or more processors. The programming includes instructions to trigger, by a service orchestrator, creation of one or more container instances for a service cluster. The service cluster provides a function for the telecommunications services platform. The programming includes further instructions to create, by a container manager, the one or more container instances and map, by the container manager, the one or more container instances of the service cluster to one or more virtual machines belonging to a virtual machine server group in accordance with a platform profile of the virtual machine server group and the function provided by the service cluster. The programming includes further instructions to map, by a virtual machine manager hosted on a processor, the one or more virtual machines to one or more host virtual machines of a cloud network in accordance with the platform profile of the virtual machine server group and operate the one or more host virtual machines to provide the function for the telecommunications services platform.

In accordance with an embodiment, each of the one or more host virtual machines comprise a plurality of first network ports, and each of the plurality of first network ports provides a connections to a different type of network traffic. In accordance with an embodiment, each of the one or more container instances comprises a plurality of second network ports, and each of the one or more host virtual machines comprises one or more virtual network switches to route traffic between the plurality of first network ports and the plurality of second network ports.

Although the description has been described in detail, it should be understood that various changes, substitutions, and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
    triggering, by a service orchestrator hosted on a processor, creation of one or more container instances for a first service cluster, wherein the first service cluster provides a first service for a telecommunications services platform;
    creating, by a container manager hosted on a processor, the one or more container instances;
    mapping, by the container manager, the one or more container instances of the first service cluster to one or more first virtual machines belonging to a first virtual machine server group in accordance with a platform profile of the first virtual machine server group and the first service provided by the first service cluster;
    mapping, by a virtual machine manager hosted on a processor, the one or more first virtual machines to one or more first host virtual machines of a cloud network in accordance with the platform profile of the first virtual machine server group; and
    deploying the one or more first host virtual machines on one or more host processors.

2. The method of claim 1, wherein the platform profile comprises computer processing unit (CPU) parameters, network interface parameters, block storage parameters, random access memory parameters, or a combination thereof provided by each of the one or more first virtual machines belonging to the first virtual machine server group.

3. The method of claim 1 further comprising:
    registering the one or more container instances with a service registrar; and
    adding, by the service registrar, internet protocol (IP) addresses for interfaces of the one or more container instances with a domain name system (DNS), wherein the IP addresses for the interfaces of the one or more container instances are each in accordance with a fully qualified domain name (FQDN) of the first service, and wherein the interfaces of the one or more container instances are discoverable by other components of the telecommunications services platform by performing a DNS search on the FQDN.

4. The method of claim 3 further comprising restricting discovery of the interfaces of the one or more container instances to components of the telecommunications services platform deployed on processors located at a same deployment site as the one or more host processors.

5. The method of claim 3, wherein the other components of the telecommunications services platform are deployed across all deployment sites of the telecommunications services platform.

6. The method of claim 1 further comprising ensuring, by the container manager, at least a minimum number of virtual machines are available in the first virtual machine server group for the first service cluster.

7. The method of claim 1, wherein mapping the one or more container instances to the one or more first virtual machines comprises mapping the one or more container instances to the one or more first virtual machines in accordance with an anti-affinity policy.

8. The method of claim 7, wherein the anti-affinity policy comprises:
    mapping a first one of the one or more container instances to a first one of the one or more first virtual machines; and
    mapping a second container instance of the first service cluster to the first one of the one or more first virtual machines only when all virtual machines belonging to the first virtual machine server group host at least as many container instances for the first service cluster as the first one of the one or more first virtual machines.

9. The method of claim 1 further comprising:
    bundling a first one of the one or more container instances with a second container instance, wherein the second container instance belongs to a different service cluster than the first service cluster, wherein the different service cluster provides a second service for the telecommunications services platform different than the first service; and
    mapping the second container instance to a same one of the one or more first virtual machines as the first one of the one or more container instances.

10. The method of claim 1 further comprising:
    triggering, by the service orchestrator, a ramp down of container instances in accordance with one or more service metrics of the telecommunications services platform; and
    removing, by the container manager, one or more second container instances in accordance with a ramp down trigger received from the service orchestrator.

11. The method of claim 10 further comprising forcing, by the container manager, the one or more second container instances into a drain state before removing the one or more second container instances and after receiving the ramp down trigger.

12. The method of claim 11, wherein a container completes ongoing transactions or transfers sessions and pending transactions to a different container when the container is in the drain state, and wherein a load balancer stops sending new transactions to the container when the container is in the drain state.

13. The method of claim 11, further comprising forcing, by the container manager, a container instance into the drain state when the container manager updates the container instance.

14. The method of claim 10 further comprising
setting, by the container manager, a ramp down guard timer when the one or second container instances are removed; and
not removing, by the container manager, any additional container instances in accordance with another ramp down trigger until the ramp down guard timer expires.

15. The method of claim 1 further comprising:
determining, by the container manager, when a first one of the one or more first virtual machines is overloaded due to load skew;
removing, by the container manager, a first one of the one or more container instances on the first one of the one or more first virtual machines; and
creating, by the container manager, a replacement container instance for the first service cluster on a different virtual machine belonging to the first virtual machine server group to replace the first one of the one or more container instances.

16. The method of claim 1 further comprising grouping virtual machines in the telecommunications services platform into virtual machine server groups in accordance with platform parameters provided by each of the virtual machines, wherein each virtual machine server group has a different platform profile.

17. The method of claim 16, wherein each service provided by the telecommunications services platform is mapped to a different virtual machine server group.

18. The method of claim 1, wherein mapping the one or more virtual machines to one or more host virtual machines of a cloud network in accordance with the platform profile of the first virtual machine server group comprises mapping the one or more virtual machines to one or more host virtual machines providing platform characteristics best matching the platform profile of the first virtual machine server group compared to other types of host virtual machines provided by the cloud network.

19. A method comprising:
triggering, by a processor, creation of one or more container instances for a first service cluster, wherein the first service cluster is one of a plurality of service clusters in a push-to-talk (PTT) platform, and wherein each of the plurality of service clusters provides a different function for the PTT platform;
creating, by a processor, the one or more container instances;
mapping, by a processor, the one or more container instances of the first service cluster to one or more first virtual machines belonging to a first virtual machine server group in accordance with a platform profile of the first virtual machine server group and a first PTT function provided by the first service cluster;
mapping, by a virtual machine manager hosted on a processor, the one or more virtual machines to one or more first host virtual machines of a cloud network in accordance with the platform profile of the first virtual machine server group, wherein the cloud network is deployed independently from the PTT platform; and
operating the one or more first host virtual machines on one or more host processors to provide the first PTT function for the PTT platform.

20. The method of claim 19 further comprising directing traffic originating from a PTT client on a user equipment (UE) to a deployment site in accordance with a geographic proximity of the deployment site to the UE.

21. The method of claim 19 further comprising directing traffic originating from a PTT client on a user equipment (UE) to a deployment site in accordance with a weighted round-robin load balancing policy.

22. The method of claim 19 further comprising:
receiving a registration request from a PTT client on a user equipment (UE); and
selecting a deployment site for the registration request, wherein all subsequent session initial protocol (SIP) service requests for the PTT client are directed to the deployment site.

23. The method of claim 19 further comprising supporting, by a load balancer hosted on a processor, container instance-stickiness, for session based workloads of a PTT client on a user equipment (UE).

24. The method of claim 19, wherein triggering the creation of one or more container instances for a first service cluster is in accordance with one or more service metrics, wherein the one or more service metrics comprises number of push-to-talk (PTT) pre-established sessions, PTT call setup rate, PTT call leg setup rate, number of concurrently active PTT calls, number of concurrently active PTT call legs, number of media codec instances in active use, or a combination thereof.

25. The method of claim 19 further comprising:
maintaining a first signaling path between a PTT client on a user equipment (UE) and a first deployment site of the PTT platform; and
maintaining a second signaling path between the PTT client and a second deployment site of the PTT platform, wherein the first signaling path and the second signaling path are maintained simultaneously, and wherein the first deployment site is at a different geographic location than the second deployment site.

26. The method of claim 25 further comprising transferring active sessions of the PTT client using the second signaling path when the first deployment site fails.

27. The method of claim 19 further comprising:
detecting, by a service discovery mechanism, a first deployment site of the PTT platform is partitioned from one or more second deployment sites of the PTT platform;
determining, by the service discovery mechanism, one or more third deployment sites connected the first deployment site after the first deployment site is partitioned; and
forcing, by the service discovery mechanism, the first deployment site into a dormant state when the one or more third deployment sites and the first deployment site do not account for a majority of deployment sites in the PTT platform.

28. The method of claim 27 further comprising transferring traffic from the first deployment site to the one or more second deployment sites when the first deployment site is in the dormant state.

29. A telecommunications services platform comprising:
one or more processors; and
a non-transitory computer readable storage medium storing programming for execution by the one or more processors, the programming including instructions to:

trigger, by a service orchestrator, creation of one or more container instances for a service cluster, wherein the service cluster provides a function for the telecommunications services platform;

create, by a container manager, the one or more container instances;

map, by the container manager, the one or more container instances of the service cluster to one or more virtual machines belonging to a virtual machine server group in accordance with a platform profile of the virtual machine server group and the function provided by the service cluster;

map, by a virtual machine manager hosted on a processor, the one or more virtual machines to one or more host virtual machines of a cloud network in accordance with the platform profile of the virtual machine server group; and operate the one or more host virtual machines to provide the function for the telecommunications services platform.

30. The telecommunications services platform of claim 29, wherein each of the one or more host virtual machines comprise a plurality of first network ports, wherein each of the plurality of first network ports provides a connections to a different type of network traffic.

31. The telecommunications services platform of claim 30, wherein each of the one or more container instances comprises a plurality of second network ports, and wherein each of the one or more host virtual machines comprises one or more virtual network switches to route traffic between the plurality of first network ports and the plurality of second network ports.

* * * * *